(12) United States Patent
Majewski et al.

(10) Patent No.: US 6,725,229 B2
(45) Date of Patent: Apr. 20, 2004

(54) CONFIGURATION UTILITY

(75) Inventors: Edward Kennedy Majewski, Hoover, AL (US); Donna B. Malone, Pinson, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 258 days.

(21) Appl. No.: 09/751,281

(22) Filed: Dec. 29, 2000

(65) Prior Publication Data

US 2002/0126812 A1 Sep. 12, 2002

(51) Int. Cl.$^7$ .............................. G06F 7/00; G06F 17/00

(52) U.S. Cl. ................... 707/102; 707/3; 707/104.1; 715/507; 379/114.03

(58) Field of Search .................. 707/2, 3, 102, 707/104.1, 101; 709/224, 238, 246; 713/1, 2; 379/114.03, 114.04; 715/507

(56) References Cited

U.S. PATENT DOCUMENTS

| | | | |
|---|---|---|---|
| 5,325,290 A | * 6/1994 | Cauffman et al. | 364/401 |
| 5,640,446 A | 6/1997 | Everett et al. | |
| 5,890,014 A | * 3/1999 | Long | 395/828 |
| 5,913,218 A | * 6/1999 | Carney et al. | 707/200 |
| 5,966,431 A | 10/1999 | Reiman et al. | |
| 6,052,514 A | * 4/2000 | Gill et al. | 395/331 |

(List continued on next page.)

FOREIGN PATENT DOCUMENTS

EP 1126685 A2 * 8/2001

OTHER PUBLICATIONS

Examples of a BOCRIS CSR record published in UG–TAFI–001, Issue 6 (Sep., 1998), Chapter 9.0, "Additional Data Window" (two pages). The publication was retrieved from http://www.interconnection.bellsouth.com/guides/tafi/c9_4.htm on Jan. 5, 2000.

(List continued on next page.)

Primary Examiner—Hosain T. Alam
Assistant Examiner—Jacques Veillard
(74) Attorney, Agent, or Firm—Kirkpatrick & Lockhart LLP

(57) ABSTRACT

As part of electronically handling a large amount of data (e.g., error messages) generated within, for example, a telephone service provider's billing network, a configuration utility software allows a user to electronically change or update various configuration parameters for another software application, e.g., a loader application, and also to access the performance data generated by the loader application so as to optimize the performance of the loader application in varying data transfer situations. The loader application, in turn, is a computer-based data transfer application that electronically loads a large volume of data, e.g., telecommunication billing data, from one computer into another computer. The loader application thus substantially reduces human involvement during transfers of large amount of data, and thereby also reduces errors typically associated with manual data entries by human data operators. After completion of data transfers, an error handler program facilitates electronic investigation and disposal of errors in the received data, thereby minimizing participation of human operators in the data error rectification process. The reduced reliance on manual identification and correction of data errors thus results in increased accuracy and efficiency in the overall network data management and customer billing operations.

12 Claims, 19 Drawing Sheets

U.S. PATENT DOCUMENTS

| | | | |
|---|---|---|---|
| 6,098,064 A | | 8/2000 | Pirolli et al. |
| 6,151,605 A | * | 11/2000 | Costa .......................... 707/101 |
| 6,243,745 B1 | * | 6/2001 | Casey et al. ................. 709/220 |
| 6,266,675 B1 | | 7/2001 | Evans et al. |
| 6,389,427 B1 | * | 5/2002 | Faulkner .................. 707/104.1 |
| 6,434,572 B2 | * | 8/2002 | Derzay et al. ............ 707/104.1 |
| 6,438,219 B1 | * | 8/2002 | Karau et al. ............ 379/112.01 |
| 6,442,568 B1 | * | 8/2002 | Velasco et al. .......... 707/104.1 |
| 6,532,281 B1 | * | 3/2003 | Schoenborn ........... 379/114.01 |
| 2001/0034732 A1 | | 10/2001 | Vorholt et al. |
| 2002/0123983 A1 | | 9/2002 | Riley et al. |

OTHER PUBLICATIONS

Nora K. Shire, "New Method of Accessing Information Wins State Recognition", two pages, published on Jun. 12, 1995 and retrieved from http://oac3.hsc.uth.tmc.edu/pub_affairs/mm/kiddos.html on Apr. 2, 2000.

U.S. patent application Ser. No. 09/751,283, filed Dec. 29, 2000. (Attorney Docket No. 99480).

U.S. patent application Ser. No. 10/410,104, filed Apr. 9, 2003. (Attorney Docket No. 99485 DIV).

U.S. patent application Ser. No. 09/751,282, filed Dec. 29, 2000. (Attorney Docket No. 99486).

Provisional Patent Application No. 60/327,111, filed Oct. 3, 2001. (Attorney Docket No. 99490P).

U.S. patent application Ser. No. 10/140,684 filed May 7, 2002. (Attorney Docket No. 99490).

* cited by examiner

| | | | | MP8190 Loader Configuration Manager (DSN=CBS24_BBIDEV1) | | | 77 |
|---|---|---|---|---|---|---|---|

MP8190 Loader's Manager Review

MP8190 Loader Activity Review

Click the 'Cancel' button to cancel this form. Click the 'Print' button to print this form's data. Click the 'Change Date' button to review a different date.

Activity for 10 May 1999

| Id | Site Description | File Name | BUFIT Verify | Primary Process Status Area | | Records |
|---|---|---|---|---|---|---|
| | | | | Data Load | Data Analysis | |
| 0 | Macon | P | Ready | No Attempt | No Attempt | 0 |
| 1 | Atlanta | O | Ready | No Attempt | No Attempt | 0 |
| 2 | Tennessee | T | Ready | No Attempt | No Attempt | 0 |
| 3 | Mississippi | M | Ready | No Attempt | No Attempt | 0 |
| 4 | Alabama | A | Ready | No Attempt | No Attempt | 0 |
| 5 | Louisiana | L | Ready | No Attempt | No Attempt | 0 |
| 6 | Kentucky | K | Ready | No Attempt | No Attempt | 0 |
| 7 | Jacksonville | Y | Ready | No Attempt | No Attempt | 0 |
| 8 | Fort Lauderdale | R | Ready | No Attempt | No Attempt | 0 |
| 9 | Miami | Q | Ready | No Attempt | No Attempt | 0 |
| 10 | South Carolina | W | Ready | No Attempt | No Attempt | 0 |
| 11 | North Carolina | X | Ready | No Attempt | No Attempt | 0 |

[ Cancel ]     [ Print ]     [ Change Date... ]

| | |
|---|---|
| 1. Site_ID | the site's numeric affiliation<br>(Default value - the primary key from the Site_Information table) |
| 2. Site_Code | the site's single character affiliation<br>(Default value - data originates from the Site_Information table) |
| 3. Site_Description | the description name of the site<br>(Default value - data originates from the Site_Infromation table) |
| 4. File_Name | the site's file name to copy<br>(Default value - empty) |
| 5. Previous_File_Name | the site's file name of the previously copied file (Default value - data originates from the Site_Information table) |
| 6. Create_Date | the date stamp at the creation of this entry<br>(Default value - current day's date) |
| 7. Verify_Status | numeric value illustrating the state of this entry<br>(Default value - (-1)) |
| 8. Verify_Start_Time | the entry's copy start time stamp formatted 'hh:mm:ss'<br>(Default value - default date) |
| 9. Verify_Stop_Time | the entry's copy stop time stamp formatted 'hh:mm:ss'<br>(Default value - default date) |
| 10. Load_Status | numeric value illustrating the state of this entry<br>(Default value - (-2)) |
| 11. Load_Start_Time | the entry's load start time stamp formatted 'hh:mm:ss'<br>(Default value - default date) |
| 12. Load_Stop_Time | the entry's load stop time stamp formatted 'hh:mm:ss'<br>(Default value - default date) |
| 13. Analysis_Status | numeric value illustrating the state of this entry<br>(Default value - (-2)) |
| 14. Analysis_Start_Time | the entry's analysis start time stamp formatted 'hh:mm:ss'<br>(Default value - default date) |
| 15. Analysis_Stop_Time | the entry's analysis stop time stamp formatted 'hh:mm:ss'<br>(Default value - default date) |

FIG. 12

| Field Name | Field type | Starting Position | Length | Example | Default value |
|---|---|---|---|---|---|
| Work category | char | 1 | 25 | Pots Unidentified | empty string |
| Case Id | integer | 27 | 11 | 2023935 | 0 |
| Create date | datetime | 39 | 8 | 97/07/25 | 01/01/1901 |
| month | | 42 | 2 | 07 | |
| day | | 45 | 2 | 25 | |
| year | | 39 | 2 | 97 | |
| Critical code | char | 48 | 1 | # | |
| Phone number | char | 49 | 10 | 2055551212 | empty string |
| Investigator | char | 62 | 18 | PCPROG8-AL | empty string |
| Hold indicator | char | 90 | 2 | UA | BK |
| Ani indicator | char | 94 | 1 | N | |
| Earliest date | datetime | 97 | 8 | 97/07/21 | 01/01/1901 |
| month | | 100 | 2 | 07 | |
| day | | 103 | 2 | 21 | |
| year | | 97 | 2 | 97 | |
| Latest date | datetime | 106 | 8 | 97/07/24 | 01/01/1901 |
| month | | 109 | 2 | 07 | |
| day | | 112 | 2 | 24 | |
| year | | 106 | 2 | 97 | |
| Carrier code | char | 116 | 4 | 0000 | empty string |
| Error code | char | 123 | 5 | 6L | Blank |
| Messages | integer | 128 | 10 | 128 | 0 |
| Credit indicator | char | 148 | 2 | CR | |
| Revenue (credit) | money | 138 | 10 | $12.00 | $0 |
| Revenue (no credit) | money | 138 | 12 | $12.00 | $0 |
| Append date | datetime | 151 | 8 | 97/07/24 | 01/01/1901 |
| month | | 154 | 2 | 07 | |
| day | | 157 | 2 | 24 | |
| year | | 151 | 2 | 97 | |
| Last presented | char | 159 | 8 | 01011901 | empty string |

Site Information
Site_ID (region)
Site Description

User IDs
Work_Type
User_ID
User_Pswd

Case Status
Case_Status_Flag
Status_Description

Case Disposal
Work_Type
Case_Status_Flag
Disposal_Indicator
Disposal_Remarks
Disposal_Abbr_Remarks

Work Types
Work_Type
Work Description
Msg_Limit_Min
Msg_Limit_Max
Rev_Limit_Min
Rev_Limit_Max
Append_Date
Audit_Flag
Audit_Count
Perform_Update
SQL_Special

Carrier Codes
Work_Type
Carrier_Code

Daily Schedule
Sched_ID
Work_Type
Site_ID
Target Cases
Handled Cases
Disposed Cases
Create_Date
Status_Flag

Hold Indicator
Work_Type
Hold_Indicator

Error Codes
Work_Type
Error_Code

FIG. 22

CONFIGURATION UTILITY

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND

1. Field of the Invention

The present invention broadly relates to data management systems, and more particularly, to a system and method for electronically changing configuration data for a software application.

2. Description of the Related Art

Millions of telephone calls are routinely placed in a telephone service provider's network. Telephone communication has seen a phenomenal growth since its inception because of its extreme usefulness in today's world. Traditional wireline telephone networks (e.g., the PSTN (Public Switched Telephone Network) or POTS (Plain Old Telephone System)) as well as the more recent wireless telephone networks (e.g., cellular wireless networks) have played a significant role in increasing the telephone traffic carried by a telephone service provider. It is hard, and almost impossible, to conceive a world without telephones. Telephones seem to have become an integral part of a civilized society.

In addition to oral communication, telephone connections are also made for data transfer activities, e.g., to transmit a fax or to send an electronic data file to another computer. The daily, widespread use of telephones requires a telephone service provider to maintain a log of its telephone line usage and devise appropriate telephone usage billing mechanisms. Billing or accounting errors may occur when telephone calls are improperly billed, for example, when charges appear on a subscriber's telephone bill for telephone calls that were abruptly terminated without any fault of the subscriber or for telephone calls that were charged at a rate different from the one the subscriber initially signed up for. A telephone service provider (TSP), thus, has to devise schemes to monitor and redress customer grievances for faulty billing.

As part of a streamlined billing and accounting procedure, the TSP may set up a central location or facility that houses service personnel authorized to access customer account data (e.g., for account maintenance or status inquiry) for all the customers in the service provider's network. Such a central processing facility collects the subscriber data from various regional offices and processes them according to the TSP's policy and guidelines. For example, a TSP may provide telephone services in Alabama, Kentucky, Tennessee and Atlanta, Ga. The TSP may have regional offices or regional service centers at these locations. In addition to these regional service centers, the TSP may set up a central processing facility at Atlanta, Ga. Therefore, the subscriber data (including, for example, the call records, the account information, the billing data, etc.) from all other regional service centers may have to be sent to the central processing facility for coordination of billing as well as account management.

Furthermore, the central processing facility may be at a location that is physically different from the location of the TSP's regional service center in Atlanta. In other words, the central facility may be in a building different from that for the TSP's regional service center. It is therefore desirable to achieve efficient data transfer between these two locations as well as between the central processing facility and other remote regional centers in view of the enormous data (including call records and billing data) generated within the TSP's network.

As used hereinbelow, a "message" or "call record" is generated and recorded as part of a telephone service provider's billing system each time a communication takes place between two parties through a call that was placed using the telephone service provider's network. Such messages typically appear on a telephone bill sent to the telephone subscriber. The term "error message", as used hereinbelow, refers to a message that falls out of the regular billing stream due to a variety of reasons, for example, when a telephone subscriber complains about an erroneous entry or message on the subscriber's telephone bill and the telephone service provider's customer service person takes the message off the subscriber's bill and/or places the message under further investigation by appropriate service personnel. An error message may be generated when conflicting provisions in customer billing guidelines prevent the billing computer system from meaningfully keeping the message in the regular billing stream.

The term "case" is used hereinbelow to refer to a group of error messages that may be grouped together because of a common characteristic or a commonly identifiable error pattern. For example, when a new residential customer subscribes for a phone connection, the telephone service provider may inform the new customer that the customer's telephone line will start "working" (i.e., the customer will be able to receive a dial tone over the telephone line) from a specific date and/or time. This customer account activation information may then reside in a telephone service order (TSO) system in the service provider's mainframe computer for the regional office serving the customer. However, the telephone line in the new customer's residence may have been erroneously left activated by the service provider when the prior resident vacated that place. Thus, even though the telephone line is physically active, the billing system may not "recognize" it as being active until the activation date and/or time arrives. In other words, all telephone calls placed during this period of discrepancy may generate corresponding error messages with a common error pattern. These error messages may then be grouped as a case to facilitate quicker investigation thereof.

FIG. 1 illustrates a prior art scheme to transfer data from a mainframe computer system 25 in a TSP's regional service center to a central database 27 in a central processing facility. FIG. 1 further shows how error messages are handled by service personnel of the TSP. Billing data (including error messages) as well as customer account information and other data may reside in a regional mainframe computer system 25 in the TSP's network. The mainframe computer 25 may be physically located at a location remote from the central location (e.g., the central processing facility) where an authorized service person (ASP) or operator 29 of the TSP performs data processing, including processing of error messages. The ASP 29 may be located in a facility that houses other operators handling accounting/billing for the TSP.

Initially, the authorized service person 29 obtains printouts of data reports 30 generated by the mainframe system 25. These printouts 30 may contain text in ASCII (American Standards Code for Information Interchange) format. The printouts of data 30 may be sent to the ASP 29 via a third party hired by the TSP to maintain its customer accounts and coordinate the billing procedure. The ASP 29 thereafter begins manual data entry to transfer the data from the printouts 30 to the database 27 established in a local SQL server 32 (e.g., a Microsoft® SQL server) using a keyboard (not shown) or other data entry device for the workstation 34 operated by the ASP 29. The workstation 34 and the SQL server 32 form a client/server relationship for data transfer and database management operations. The steps involved in manual entry of data into the database 30 are discussed hereinbelow with reference to FIG. 2.

FIG. 2 outlines the steps involved when the operator 29 manually enters data from data printouts 30 into the database 27 using the workstation 34. The data entry process starts at step 36. At step 38, the operator 29 instructs the operating system (using the keyboard or another data entry device) running on the workstation 34 to execute an enterprise manager program residing in the workstation's 34 memory. Upon execution, the enterprise manager program establishes a link or connection between the workstation 34 and the SQL server 32 at step 40. In other words, data transfer can now be carried out between the workstation 34 and the SQL server 32. At step 42, the operator 29 opens the database 27 in the SQL server 32 remotely from the workstation 34 using the keyboard (not shown) or other data entry device for the workstation 34. Once the database is opened, the operator 29, at step 44, runs a query manager program residing in the workstation's 34 memory. Thereafter, the operator 29 executes an Insert Query command for each data entry on the printed reports 30 and manually enters the data from the printed reports 30 into the database 27. Once all the data on the printouts 30 are entered into the database 27, the ASP 29 closes the enterprise manager program at step 48. This signifies, at step 50, the completion of the manual data entry process.

Instead of storing the data into a central database, e.g., the database 27 in the SQL server 32, the ASP 29 may instead set-up or create a local database, e.g., a Microsoft Access® (MS Access) database, in the workstation's 34 memory. The manual data entry process for the MS Access database is essentially the same as depicted in FIG. 2, except that step 40 is absent in such a situation and the operator 29 opens the database in the workstation 34 instead of a server as in step 42.

The manual data entry process as outlined above is not only cumbersome and error-prone, but a quite inefficient utilization of manpower and computer resources given the ever-increasing demand for telephone services and, hence, correspondingly increasing amount of subscriber account and billing data. Employment of more service personnel to timely complete the data entry task is not a desirable solution given the enormous amount of data being generated by all the mainframe systems in the TSP's network. Further, manual data entry is error-prone given the monotonous and cumbersome nature of the data entry process. Human data operators may not perform at their best when the task is inherently tedious and boring.

It may therefore be desirable to devise a computer-based application that automatically and efficiently accomplishes transfer of large amounts of data from a number of mainframe systems to a central data base in a timely manner with minimal human involvement. It may further be desirable to simplify user access to the configuration parameters used by the computer-based application so as to enable the user to optimize the performance of the application in varying work conditions. Additionally, it is further desirable to substantially eliminate errors occurring during various data transfers so as to enable TSP service personnel to expedite further processing of available data.

As noted hereinbefore, FIG. 1 also illustrates how error messages are handled by service personnel of the TSP. The data reports or printouts 30 may include cases slated for review and investigation by the ASP 29. At the beginning of each case, a summary may be present informing the ASP 29 about the particular case. The summary may include a case-ID associated with the corresponding case. The case-ID may identify, e.g., symbolically or through a numerical code, the error or other salient characteristics common to the error messages contained in the corresponding case. For example, case-ID=60 may signify an invalid account status. The remaining text in the summary may succinctly mention other information, e.g., number of error messages contained in the given case, total amount in error, the name of the telephone carrier (e.g., a long-distance telephone company) that may be fully or partially responsible for the customer account being investigated, etc.

The ASP 29 manually inspects the printouts 30, one printout at a time, and manually identifies the errors from the case-IDs. Thereafter, the ASP 29 initiates error message processing by accessing, through the workstation 34, a CLUE (Correction of Local Usage Errors) system running on the mainframe computer 25. The mainframe computer system 25 is accessed so that the ASP 29 may actually enter appropriate processing notations for the error messages. The processing notation beside an error message may indicate whether the error message is deleted from the regular billing stream (i.e., the subscriber receiving credit for the error message), or whether the error message stays in the billing stream (i.e., the error message in fact does not contain an error and the subscriber is responsible for the amount charged), or whether the error message requires further investigation (e.g., by accessing other systems on the mainframe computer 25).

The CLUE system (not shown) is an application software running on the mainframe computer 25 that stores all error messages that are detected in the corresponding regional billing system of the TSP. The CLUE system includes a database of error messages for the region covered by the mainframe system 25 and functions separately from the regular billing system for that region. The ASP 29 or other operator may first initiate a network connection to the mainframe computer 25 via an emulator program (not shown) in the workstation 34. Once the network connection is established, the ASP 29 may "enter" the CLUE system and start manually keying-in (using the keyboard or other data entry device for the workstation 34) data for the error messages into the CLUE system. For each error message, the ASP 29 may also manually enter the corresponding processing notation (described hereinbefore) in the CLUE system. If no further investigation is needed for an error message, the ASP 29 may either rectify the error according to a predetermined set of instructions and send the corresponding error message to the regular billing system in the mainframe 25 or delete the error message from the CLUE system (and, hence, also from the regular billing stream).

However, in case of a further investigation, the ASP 29 may manually access (through the workstation 34) another system on the mainframe computer 25. For example, if an error message requires ascertaining a customer's telephone line configuration record or customer service record (CSR) (i.e., services selected by the customer on a given telephone line), the ASP 29 may access (through the workstation 34) a BOCRIS (Business Office Customer Records Information System) database (not shown) maintained on the mainframe system 25. On the other hand, if an error message necessitates looking at the customer's previous billing history or changes made to the BOCRIS database for a specific telephone line, then the ASP 29 may access the TSO (telecommunications service order) database (not shown) to retrieve the pertinent information. The ASP 29 may also need to access the GUIDE (Graphical User Interface Design Editor) system running on the mainframe computer 25 that keeps a table that instructs the billing system how to do billing for each phone number (e.g., whether to charge a promotional rate or whether to waive a monthly fee, etc.). Other applications running on the mainframe 25 may also be accessed depending on the error message and depending on the required investigation. Based on the information obtained from one or more of these systems, the ASP 29 manually either deletes the error message from the CLUE database or releases the error message for regular billing. In case of the need for still further investigation, the ASP 29 may place an appropriate notation against the error message in the CLUE system.

The foregoing describes a prior art method where investigators access the CLUE system to manually look up the cases and manually investigate and/or correct the error messages contained therein. A TSP operating in a number of states may face a daunting task of rectifying and/or investigating around 2–3 million cases (i.e., around 25–30 million error messages) per month in a timely fashion. The growth in the telephone industry and human population may generate with them additional subscriber base and, hence, additional telephone traffic. This further increases the already humongous case load each investigator has to manually handle in the TSP's central accounting facility. Manual correction of error messages seems to be a losing battle in view of ever increasing case data volume.

It is therefore desirable to devise a data management scheme to minimize involvement of human operators when a large volume of data is being handled. It is further desirable to substantially expedite correction of error messages with an automated arrangement to identify and rectify a large portion of error messages.

SUMMARY

The present invention contemplates a method of changing one or more configuration parameters in a configuration file for a software application residing on a computer. The method comprises displaying an interactive form on a display screen for the computer, wherein the interactive form lists each of the one or more configuration parameters along with a current value associated therewith; receiving a first input from a user of the computer, wherein the first input from the user provides one or more replacement values that replace corresponding one or more current values as displayed on the interactive form; receiving a second input from the user; accessing the configuration file for the software application in response to the second input from the user; and electronically replacing the one or more current values in the configuration file with the one or more replacement values corresponding thereto. The configuration utility software allows a user to electronically change or update various configuration parameters for another software application, and also to access the performance data generated by the software application so as to optimize the performance of the software application in varying data transfer situations.

The configuration utility software also allows the user to review process status values for a software application residing on a computer. The method for reviewing process status values comprises displaying a first interactive form on a display screen for the computer, wherein the first interactive form allows the user of the computer to select a date for which the user wishes to review the process status values for the software application; receiving a first input from the user, wherein the first input from the user specifies the date that the user wishes to review the process status values for; receiving a second input from the user; and displaying a second interactive form on the display screen in response to the second input from the user, wherein the second interactive form contains the process status values for the software application for the date selected by the user.

The present invention further contemplates a loader application, which is a computer-based data transfer application that electronically loads a large volume of data, e.g., telecommunication billing data, from one computer into another computer. The data transfer arrangement for the loader application may include a first computer having a data file stored therein, a second computer coupled to the first computer via a communication network, and a third computer in communication with the second computer. The loader application may reside on the third computer. Upon execution, the loader application may cause the third computer to import data stored in the data file in the first computer into a storage location in the second computer. As part of the data loading operation, the loader application may cause the third computer to identify the data file stored in the first computer, and to copy the data file from the first computer into the storage location within the second computer. The loader application thus substantially reduces human involvement during transfers of large amounts of data, and thereby also reduces errors typically associated with manual data entries by human data operators.

The loader application may transfer the data from a remote mainframe computer system to a local server computer. After completion of the data transfer by the loader application, an error handler program facilitates electronic investigation and disposal of errors in the received data, thereby minimizing participation of human operators in the data error rectification process. The error handler program may reside on a user's workstation, and, upon execution, the error handler program first causes the workstation to retrieve the data from the server computer. Thus, the error handler program operates on the data locally stored in the workstation, and, hence, obviates the need to frequently access the server computer during processing of a large amount of data. After the data are stored locally in the workstation, the error handler program commences investigation and correction of data errors according to one or more predetermined analysis criteria specified by the user. The reduced reliance on manual identification and correction of data errors by human operators thus results in increased accuracy and efficiency in the overall data management and customer billing operations for a commercial enterprise.

The configuration utility software, the loader application and the error handler program thus allow expeditious handling of a large amount of data (e.g., error messages) generated within, for example, a telephone service provider's billing network. The electronic data management with the help of these software not only reduces errors encountered when performing the data management operations manually, but also improves overall processing efficiency. The data processing may be carried out from a central location in a timely manner, and with minimal human involvement. The overall improvement in the accuracy and speed of data processing is substantial when compared with predominantly manual execution of similar tasks. These and other advantages and benefits of the present invention will become apparent from the description of the embodiments below.

BRIEF DESCRIPTION OF THE DRAWINGS

Further advantages of the present invention may be better understood by referring to the following description taken in conjunction with the accompanying drawings, in which:

FIG. 1 further shows how error messages are handled by service personnel of the telephone service provider;

FIGS. 6–9 illustrate exemplary computer screen displays of various Visual Basic® form layouts generated by the configuration utility software;

FIG. 12 shows a table containing some exemplary fields created by the loader application as part of the Current_Day_Schedule view;

FIG. 15 is an exemplary table illustrating fields in a Parsing_Rules table utilized by the loader application prior to loading the data file into the SQL server database;

FIG. 22 illustrates an exemplary set of Analysis Tables in the LoaderDW database.

DETAILED DESCRIPTION OF PREFERRED EMBODIMENTS

Figure 3:
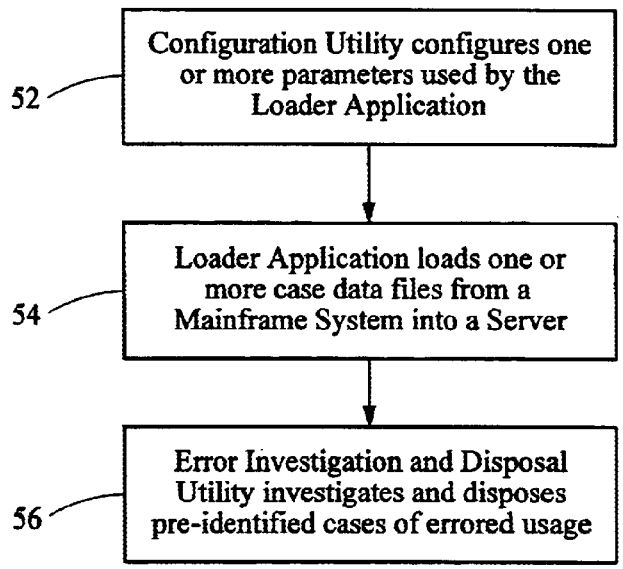
FIG. 3 depicts an exemplary relationship between the software applications of the present invention.

FIG. 3 depicts an exemplary relationship between the software applications of the present invention. The configuration utility according to the present invention is a software application that, when executed, configures one or more parameters used by the loader application as shown at block 52. The loader application, in turn, is a software program that loads one or more data files (e.g., case data files as described hereinbelow in more detail) from a mainframe computer system into a local server as shown at block 54. Finally, as shown at block 56, an error handler program operates on the data loaded by the loader application to investigate and dispose of pre-identified data sets containing error data, e.g., cases of error messages.

Although the discussion given hereinbelow focuses on data transfer and data error handling using the above mentioned three software applications in a telephone service provider's (TSP) telecommunication service billing and/or accounting systems, it is noted that these software applications (described hereinbelow in more detail) may be used in a variety of data transfer and data error correction applications, and in a number of industries where the handling of a large amount of data is required with minimal human intervention. Such data include, for example, the insurance billing data (including data files of client profiles), the data generated in the publishing industry or in a media organization (e.g., daily news archives maintained by a television network), the data generated in the medical profession (e.g., patient medical history files, patient billing data, etc.), etc.

Figure 4:
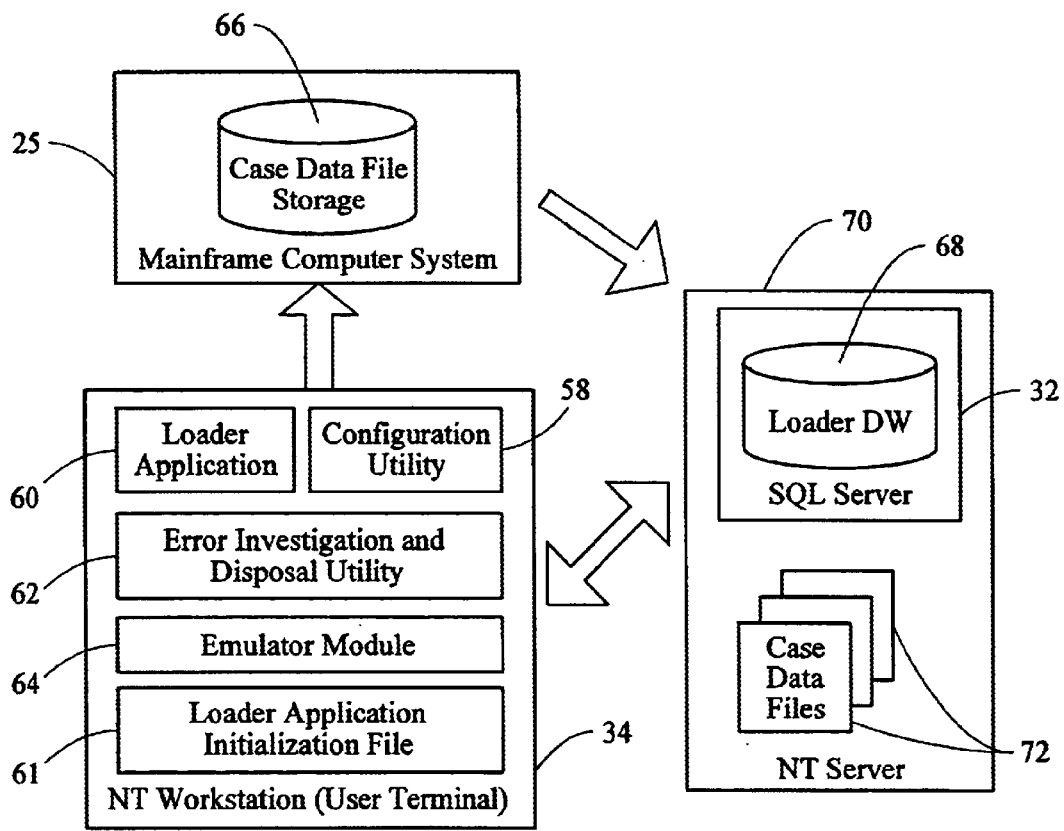
FIG. 4 shows the locations of various software applications and the databases used by the software applications of the present invention.

FIG. 4 shows the locations of various software applications and the databases used by these software applications. As depicted in FIG. 4, the three software applications, i.e., the configuration utility (CU) 58, the loader application (LA) 60 and the error handler program (EHP) 62, may reside in a memory (not shown) in the workstation 34 for the operator or ASP 29. Alternatively, one or more of these software applications may be stored on an external storage device (not shown), e.g., a compact disc (CD) ROM (read only memory) or a high-density magnetic storage medium (e.g., a floppy disk or a data cartridge) and may then be loaded into the workstation's 34 memory during execution thereof.

Typically, the software applications may reside in a non-volatile memory (e.g., a hard disk storage unit or a ROM unit) (not shown) in the workstation 34 and may be assigned appropriate volatile memory space (e.g., a RAM (random access memory) unit) by the operating system (not shown) running on the workstation 34 and executing the software applications in response to the operator's 29 command. The software applications may be stored in appropriate local directories or file folders created in the workstation's 34 memory so that a user, e.g., the ASP 29, can access and execute the desired software application. As mentioned hereinbefore, the operator or the ASP 29 may enter one or more commands through a keyboard (not shown) or other data entry device (e.g., a point-and-click device such as a computer mouse) (not shown) for the workstation 34.

In one embodiment, the workstation 34 runs on a Microsoft Windows NT® operating system. The workstation 34 may be connected to a server 70, which, in turn, may be connected to the mainframe computer system 25 via, for example, a LAN (local area network), a corporate intranet, a WAN (wide area network), a MAN (metropolitan area network), a TCP(Transmission Control Protocol)/IP (Internet Protocol) network including the Internet, a broadband computer network, a wireless communication network, or a combination of one or more of these data transfer networks. The workstation 34 and the NT server 70 are part of the central processing facility. In the event of more than one mainframe computer system being accessed during data transfer and/or data error correction, the workstation 34 may be electronically connected to such mainframe computer systems via the corresponding server 70. It is noted that more than one local server (similar to the NT server 70) and more than one SQL server 32 may be present in the TSP's accounting/billing management area to serve a number of operators. As mentioned hereinbefore, the mainframe computer systems may be remotely located at various regional service centers in the TSP's telephone network. An emulator module or software 64 residing in the workstation's 34 memory may provide the requisite access to various mainframe computer systems and also to the desired applications (e.g., CLUE, BOCRIS, etc.) running on the corresponding mainframe systems. The emulator 64 may have function calls and routine features that allow a user to press one key (e.g., F4 key on a computer keyboard) to execute a command, instead of manually typing the whole command. Such a feature may facilitate faster processing of data. In one embodiment, the emulator module 64 is the TN3270 emulator manufactured by AttachMate Corporation of 3617 131$^{st}$ Ave. S. E., Bellevue, Wash., USA 98006.

A case data file storage or case database 66 is shown as part of the mainframe computer system 25. The case database 66 may contain all the cases of error messages generated in the TSP's regional network served by the mainframe system 25. In another application (for example, in case of transfer of insurance data) the database 66 may represent storage for one or more insurance data files. As discussed in more detail hereinbelow, the loader application 60 transfers one or more case data files (more generally, "data files") from the case database 66 to another database or data warehouse (DW), i.e., the LoaderDW database 68, set-up in the SQL server 32. The loader application 60 first copies the data files 72 from the case database 66 into the local server's 70 memory (not shown). Thereafter, as discussed in more detail hereinbelow, the loader application transfers the data files 72 to the LoaderDW database 68.

As mentioned hereinbefore, the SQL server 32 may be a Microsoft® SQL server that runs on top of the local server 70. The local server 70 may be, for example, a Microsoft Windows NT® server. In one embodiment, the SQL server 32 is a Microsoft® SQL server 6.5 (with archives and retention stored procedures) and the operating system for the local server 70 is Microsoft Windows NT® 4.0 (NT pack 4.0). The NT workstation 34 and the NT server 70 thus function in a client/server environment that allows the operator or ASP 29 to access the mainframe system 25 from the workstation 34. The client-server architecture also allows the user to access various functionalities supported by the SQL server 32, including the access to the LoaderDW database 68, through queries submitted using the workstation 34. A user, e.g., the ASP 29, may access the SQL server 32 at any time using login procedures. The SQL server 32 may allow the user to perform save, read, write and/or delete operations on the data stored in the LoaderDW database 68.

Figure 5:
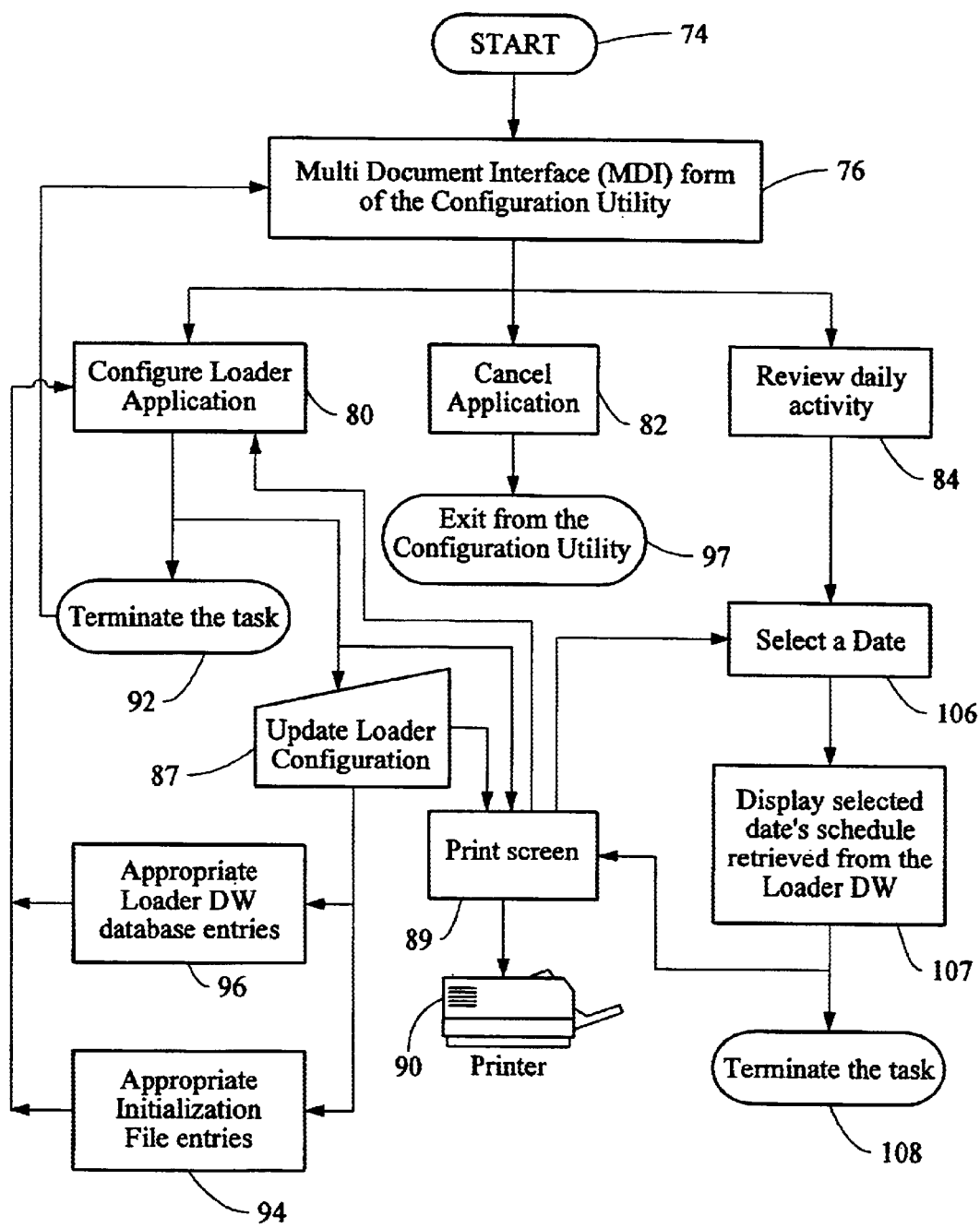
FIG. 5 is an exemplary flowchart of the functions supported by the configuration utility software.

FIG. 5 is an exemplary flowchart of the functions supported by the configuration utility software 58. The configuration utility 58 allows easy access to the configuration data used by the loader application 60 as well as to the performance data generated by the loader application 60. The configuration utility 58 provides the user with the capability to update data file source and destination directory paths. Furthermore, the configuration utility 58 allows the user to switch the startup mode of the loader application 60 from Automatic Startup to Manual Startup. The daily data file loading schedule for the loader application 60 may also be reviewed using the configuration utility 58. It is noted that although the configuration utility 58 described herein is designed for a telecommunication data loader application 60, a similar configuration utility may be designed for other data loaders as well (e.g., in the insurance industry or in the publishing industry).

In one embodiment, the configuration utility 58 is an executable Microsoft Visual Basic® file with manual or automatic startup capability of the Configuration Process (discussed hereinbelow). The automatic startup capability may be achieved through a scheduler application supported by the Windows NT® operating system and running on the workstation 34. Upon execution of the configuration utility 58 at block 74, a Multi Document Interface (MDI) process is launched by the configuration utility 58 at block 76 and loaded into the workstation's memory. The configuration utility 58 also simultaneously displays the application shell—an MDI Visual Basic® form 77 (FIG. 6)—on a display screen (not shown) of the workstation 34. In the following, various blocks in FIG. 5 are discussed in conjunction with FIGS. 6–9.

Figure 6:
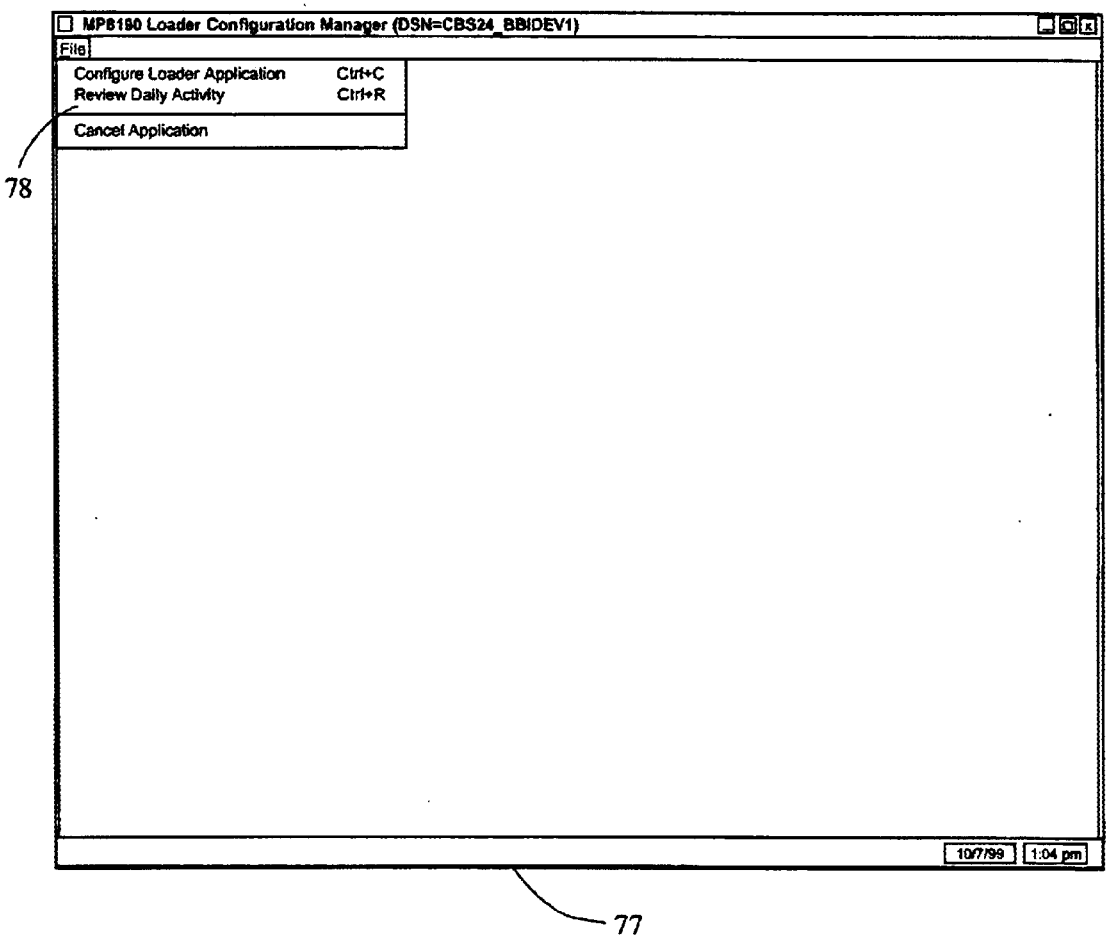

FIG. 6 illustrates an exemplary computer screen display of the layout for the MDI form 77. The MDI process operates within the constraints of the MDI form 77, which, in one embodiment, is a 32-bit Visual Basic 5.0 form that provides a multi-document container window on the workstation's 34 display screen (not shown). As shown in FIG. 6, the MDI form 77 provides a drop-down menu 78 on the workstation's 34 display screen through which the ASP 29 may access three main functionalities—the configuration process 80, the cancel process 82 and the review process 84 (FIG. 5)—supported by the configuration utility 58. The MDI form 77 displays the application menu selections to the user of the workstation 34, here, the ASP 29.

Three items are displayed on the menu 78 for the ASP 29 to select: (1) Configure Loader Application (block 80), (2) Review Daily Activity (block 84), and (3) Cancel Application (block 82). If the ASP 29 selects 'Configure Loader Application' (using a keyboard or other pointing device as discussed hereinbefore), then the MDI process performs the Open-Configuration-Form task. If the ASP 29 or other user selects 'Review Daily Activity', then the MDI process performs the Open-Review-Form task. And, if the ASP 29 selects 'Cancel Application', then the MDI process performs Termination-Application task.

Figure 7:
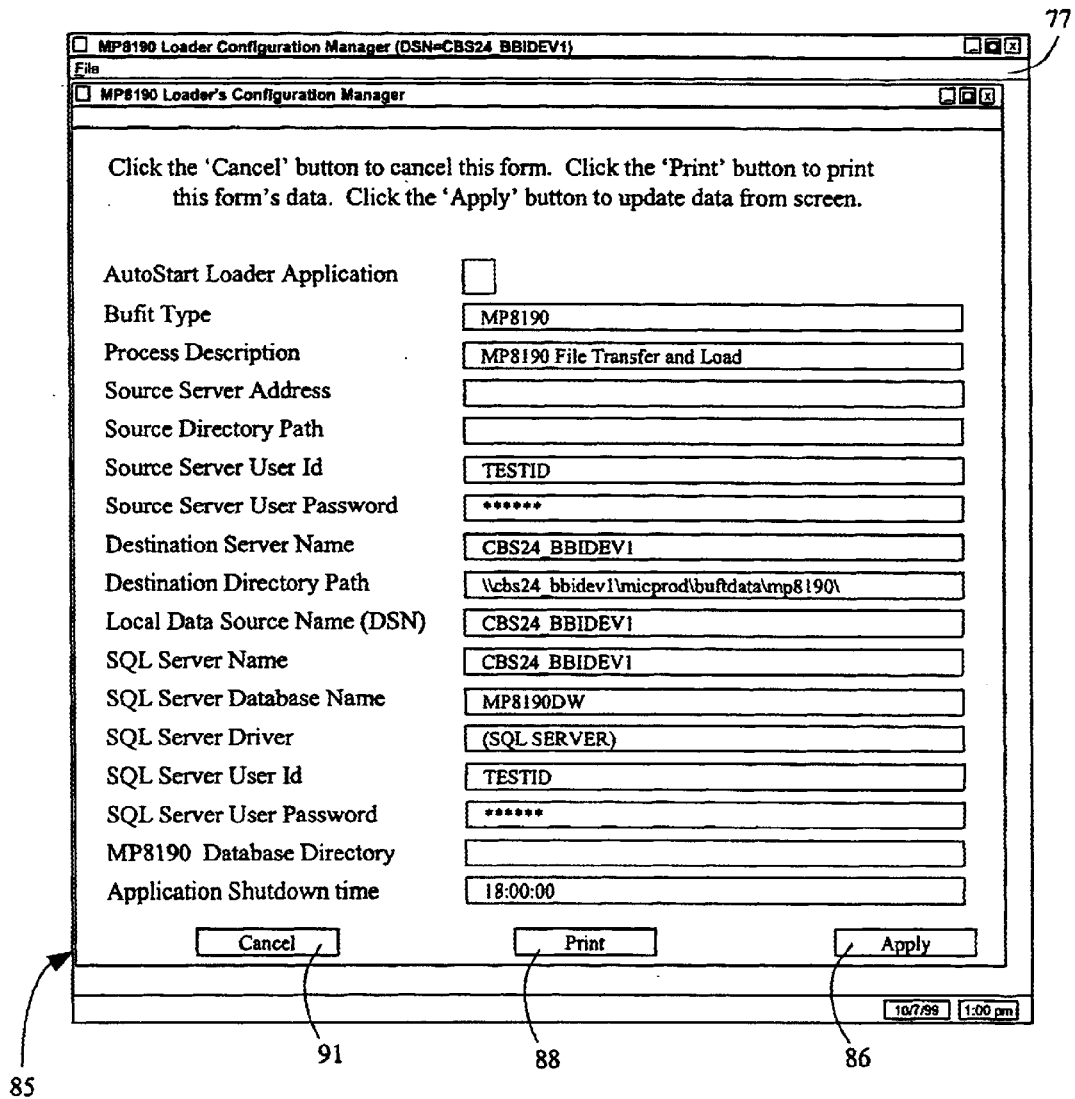

The Open-Configuration-Form task calls the configuration process (block 80), which operates within the constraints of a 32-bit, normal Visual Basic form. An exemplary computer screen display of a Visual Basic® 5.0 form layout 85 for the configuration process is illustrated in FIG. 7. The layout 85 displays the current application configuration (i.e., the current configuration parameters) for the loader application 60. Some configuration parameters depicted in FIG. 7 include 'Application Shutdown Time', 'SQL Server User ID' (here, the User ID assigned to the ASP 29), 'Source Directory Path', 'Destination Directory Path', etc.

Once in the configuration process layout 85, the ASP 29 may select one of three tasks by clicking the "button" associated with the task. When the 'Apply' button 86 is clicked, the configuration process performs the Update-Configuration task (block 87 in FIG. 5). When the 'Print' button 88 is clicked, a Print-Screen task (block 89 in FIG. 5) is performed, which prints the data displayed on the form layout 85 to a Windows NT default printer object. The ASP 29 may collect the printout from a printer 90. When the 'Cancel' button 91 is manually clicked by the ASP 29, the configuration process performs the Termination-Form task (block 92 in FIG. 5) that unloads a portion of configuration utility application 58 from the workstation's 34 volatile memory space, resulting in the removal of the configuration form layout 85 from workstation's display. However, the MDI form 77 may still remain displayed on the workstation 34, allowing the user to choose another selection from the drop-down menu 78.

The Update-Configuration task (block 87) accepts keyboard (or other data entry device) inputs from the ASP 29. The ASP 29 may input desired data for one or more configuration parameters directly on the configuration process layout 85. For example, the ASP 29 may specify the loader application's 60 shutdown time in the format of 'hh:mm:ss' (hour:minute:second) on the displayed layout 85. The configuration utility 58, through the Update-Configuration task (block 87), automatically accesses the loader application's initialization file 61 (FIG. 4) stored in the workstation 34 and writes the new shutdown time to the ShutDown field in the initialization file 61. Similar changes to any of the configuration parameters displayed on the configuration form layout 85 may be automatically entered into the loader application's initialization file 61. For example, a "true" value or a "false" value indicated for the autostart functionality of the loader application 60 (in the 'AutoStart Loader Application' parameter displayed on top of the layout 85) is automatically written to the AutoStart field in the loader application's initialization file 61. The SQL server and the NT server configuration data (e.g., the 'Source Server Address' parameter or the 'SQL server Name' parameter on the layout display 85) are accepted by the Update Configuration task and written to their appropriate fields or entries in the initialization file 61. These actions are collectively represented by the block 94 in FIG. 5.

An initialization file (e.g., the initialization file 61 in FIG. 4) is a configuration file that stores configuration data for an application (e.g., the loader application 60). The application may access the initialization file during application's execution to retrieve current configuration data therefrom. The initialization file 61 for the loader application 60 may store an Application-Setup section. The initialization file 61 may also reside in the workstation's 34 memory (typically in the non-volatile memory) along with the loader application 60. In one embodiment, the Application-Setup section may contain values for the following fields:

(1) AutoStart field: contains "true" if the Primary Process (described hereinbelow with reference to FIG. 10) of the loader application 60 automatically begins after the loader application's run statement (i.e., initiation of execution), or "false" if the Primary Process must be manually started after the loader application's run statement.

(2) ShutDown field: contains a string in the 'hh:mm:ss' format indicating the time at which the loader application will automatically shut down.

(3) DSN field: contains the Data Source Name for the desired SQL server (here, the SQL server 32). It is noted that more than one local server (similar to the NT server 70) and more than one SQL server (similar to the SQL server 32) may be present in the TSP's accounting/billing management area to serve a number of operators.

(4) NTServerPath field: contains the name of the directory location on the desired NT server (here, the server 70).

(5) NTServer field: contains the name of the desired NT server (here, the NT server 70).

(6) SQLServe field: contains the name of the desired SQL server (here, the SQL server 32).

(7) SQLDatabase field: contains the name of the SQL server database (here, the LoaderDW 68) to be accessed by the loader application 60 to store data files.

(8) SQLDriver1 field: contains the file name of the driver library for the SQL server 32.

(9) SQLDriver2 field: contains the file name of the driver library for the SQL server 32. SQLDriver1 and SQLDriver2 fields together contain the complete file name of the SQL server driver library.

(10) SQLUser field: contains the user name for the SQL server 32 login.

(11) SQLPassword field: contains the temporary user password for the SQL server 32 login.

The operator or the ASP 29 need not directly access one or more of the foregoing fields to enter the desired values therein. Instead, the ASP 29 simply enters the desired values in the space against the corresponding entry displayed on the configuration form layout 85 (FIG. 7) and clicks the 'Apply' button. The configuration utility 58 automatically performs a sequence of steps similar to that typically performed by a human operator in a prior art method of changing configuration parameters in an initialization file for a software application (block 94 in FIG. 5).

In the prior art method, the operator or the ASP 29 first manually instructs the operating system on the workstation 34 to run the Notepad.exe application program in the Microsoft Windows® software. Thereafter, the operator manually opens the initialization file (e.g., xxxx.ini file) for the software application whose configuration parameters are to be updated (e.g., the initialization file 61 for the loader application 60). The operator then visibly locates settings whose values are to be changed. The operator then manually replaces old values with the new values and saves the initialization file in the memory. Thereafter, the operator exits the Notepad application. This entire manual data entry process may be time-consuming and error-prone when frequent changes or updates to the initialization file are desired. Therefore, the configuration utility 58 according to the present invention automatically performs the foregoing operations once the ASP 29 enters the desired values on the configuration form layout display 85.

In Microsoft Windows NT® operating system, a Registry file may be provided to contain initialization data for all applications supported by the operating system. The Registry file can thus be viewed as a common initialization file for a number of applications. The configuration utility 58 according to the present invention may be modified to access and operate on the Registry file instead of individual application initialization files as discussed hereinbefore. However, a disadvantage with the Registry file is that every user that wishes to access the Registry has to be setup in the Registry with an individual access password assigned to each such user. Therefore, all users may not be able to access the Registry without such an authorization arrangement. This may not be desirable when users operating through the workstation 34 may not be determinable in advance or may be frequently changing. The individual initialization file for an application (here, the loader application 60) is preferred in such an event because of easy accessibility by every user without authorization arrangements in advance. However, individual initialization files (including the initialization file 61) may be made password protected if so desired. In short, the choice of Registry versus individual initialization file is a design choice.

In one embodiment, the configuration utility 58 communicates with the initialization file 61 for the loader application 60 using API (Application Program Interface) calls from Kernel32.DLL (Dynamically Linked Library) in the Microsoft Windows NT® operating system. API is a calling convention or interface by which an application program (here, the configuration utility 58) accesses the operating system and other services supported by the operating system. The DLL is a library that is linked to application programs when they are loaded or run rather than at the final phase of compilation. This means that the same block of library code can be shared between several application programs rather than each application program containing copies of the routines it uses.

The configuration utility 58 executes one of three functions after each API call to the loader application's initialization file 61. The functions are: (1) Read Profile INT ( ); (2) Read Profile STRING ( ); and (3) Write Profile STRING ( ). In the parenthesis, each function receives a set of parameters as arguments for that function. The parameters that are read from or written to the initialization file 61 as function arguments include: Section Name, Title Name, Buffer Length, Storage Variable, and Initialization File Path and Name. These parameters are passed on to the loader application's initialization file 61 during each instance of program execution (i.e., during each time the configuration utility 58 is executed by the user to update a value in the initialization file 61). Thus, the values for the initialization file 61 are passed (by the configuration utility 58) as arguments to the appropriate one of the above-mentioned functions.

The Update-Configuration task (block 87 in FIG. 5) also performs changes to one or more SQL server 32 and NT server 70 configuration data by writing the configuration data (entered by the ASP 29 on the configuration form layout 85) into their appropriate initialization file 61 entries. Additionally, the Update-Configuration task accepts keyboard input (from the operator or ASP 29 using the workstation 34) through the configuration form layout's 'Source Directory Path', 'Destination Directory Path' and the 'Process Description' text areas (FIG. 7) and writes the input values received into the Load_Type table in the LoaderDW.DAT database 68 in the SQL server 32 (block 96 in FIG. 5). The Load_Type table may contain a Source_Dir (source directory) field, a Dest_Dir (destination directory) field, a Remote_Computer_User_ID (user ID for the user operating the workstation 34) field and a Remote_Computer User_PSWD (user password for the user operating the workstation 34) field. In one embodiment, a message box (not shown) may appear on the workstation's display screen prompting the user's confirmation before the Update-Configuration task proceeds with accessing the LoaderDW.DAT database 68.

In a prior art method, changes to data entries in the LoaderDW database 68 would require the following steps to be manually performed by the operator or ASP 29 using the workstation 34. The steps are: (1) Run Microsoft SQL Enterprise Manager program (an executable application) using the workstation 34; (2) Connect to the SQL server 32 using the NT workstation 34; (3) Open the LoaderDW database 68 using the NT workstation 34; (4) Run the Query Manager utility in the NT workstation 34; (5) Execute (from the workstation 34) 'Update Action Query' to change any value in a table selected in the LoaderDW database 68; and (6) Exit the Microsoft SQL Enterprise Manager program. The manual execution of the foregoing steps is avoided by using the configuration utility 58. All the ASP 29 has to do now is to run the configuration utility 58 on the NT workstation 34 and to click the 'Apply' button once desired data have been entered on the configuration form layout 85 displayed on the workstation screen (not shown). The configuration utility 58 (through its Update-Configuration task) automatically performs the necessary steps (e.g., running the Enterprise Manager program, opening the LoaderDW database, etc.) and makes necessary entries in the LoaderDW database (block 96 in FIG. 5) without requiring further manual input from the operator or the ASP 29.

Figure 21:
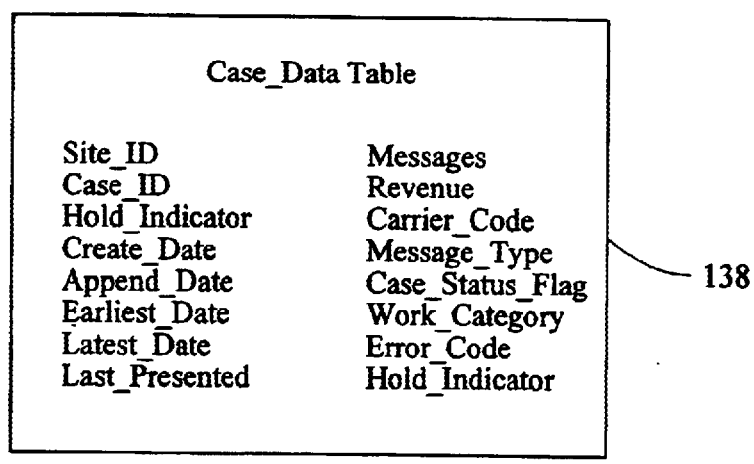
FIG. 21 shows an exemplary Data Table in the LoaderDW database.

In one embodiment, the LoaderDW is a Microsoft SQL Server 6.5 database. The LoaderDW database 68 may contain the following tables: (1) Load_Type table with read/write permissions; (2) Site_Information table with read/write permissions; (3) Parsing_Rules table with read permissions (an exemplary Parsing_Rules table is illustrated in FIG. 15); (4) User_Login table with read/write/save/delete permissions; (5) Download_Schedule table with read/write/save/delete permissions; (6) Analysis Tables (if any) with read/write/save/delete permissions (an exemplary set of Analysis Tables 175 is illustrated in FIG. 22); and (7) Data Tables with read/write/save/delete permissions (an exemplary Data Table 138 is illustrated in FIG. 21). Each table allows one or more functions (e.g., reading, writing, saving, deleting) to be performed on the data stored therein. The LoaderDW database 68 may also contain a Current_Day_Schedule view of the Download_Schedule table with read permissions to the load status data. The Current_Day_Schedule view is an SQL view that the user may perceive as an SQL table, but it is in fact a subset of one or more tables (here, a subset of the Download_Schedule table). The appropriate "permissions" to read, write, save or delete data in a given table must be defined (or "granted") during the design phase of the LoaderDW database 68.

The following is a general description of the type of data contained in the tables in the LoaderDW database 68. The Load_Type table contains specific information for the location of the data files for the loader application 60. The Site_Information table contains site-specific information for each site (i.e., each remote mainframe computer system) in the TSP's billing network. The Parsing_Rules table contains specific information relating to the parsing rules for a data file loaded by the loader application 60. The User_Login table contains specific information about the users of the LoaderDW database 68. The Download_Schedule table contains entries of current and past daily processes handled by the loader application 60. Analysis Tables may be application-specific and contain summary or calculated data. Data Tables contain the detail data from the data files (which may contain ASCII data) retrieved by the loader application 60. The Current_Day_Schedule view of the Download_Schedule table displays (on the workstation 34) all records for the calendar day when requested by the operator or ASP 29.

It is noted that the configuration utility 58 may interface (or access) the Site_information table, the Load_Type table and the Current_Day_Schedule view of the Download_Schedule table during its operation. On the other hand, the loader application 60 may interface the Load_Type table, the Site_Information table, the Parsing_Rules table, the User_Login table, the Download_Schedule table, one or more Analysis Tables (if any) and one or more Data Tables.

As mentioned hereinbefore, if the ASP 29 or other user selects 'Cancel Application' (block 82 in FIG. 5) on the selection menu 78 on the MDI (Multi Document Interface) form 77 (FIG. 6), then the MDI process performs a Termination-Application task. The Termination-Application task unloads the entire configuration utility application 58 from the workstation's 34 volatile memory space. This results in removal of the MDI form 77 from the workstation display (not shown) and the user exits from the configuration utility application 58 as indicated by block 97 in FIG. 5.

Figure 8:
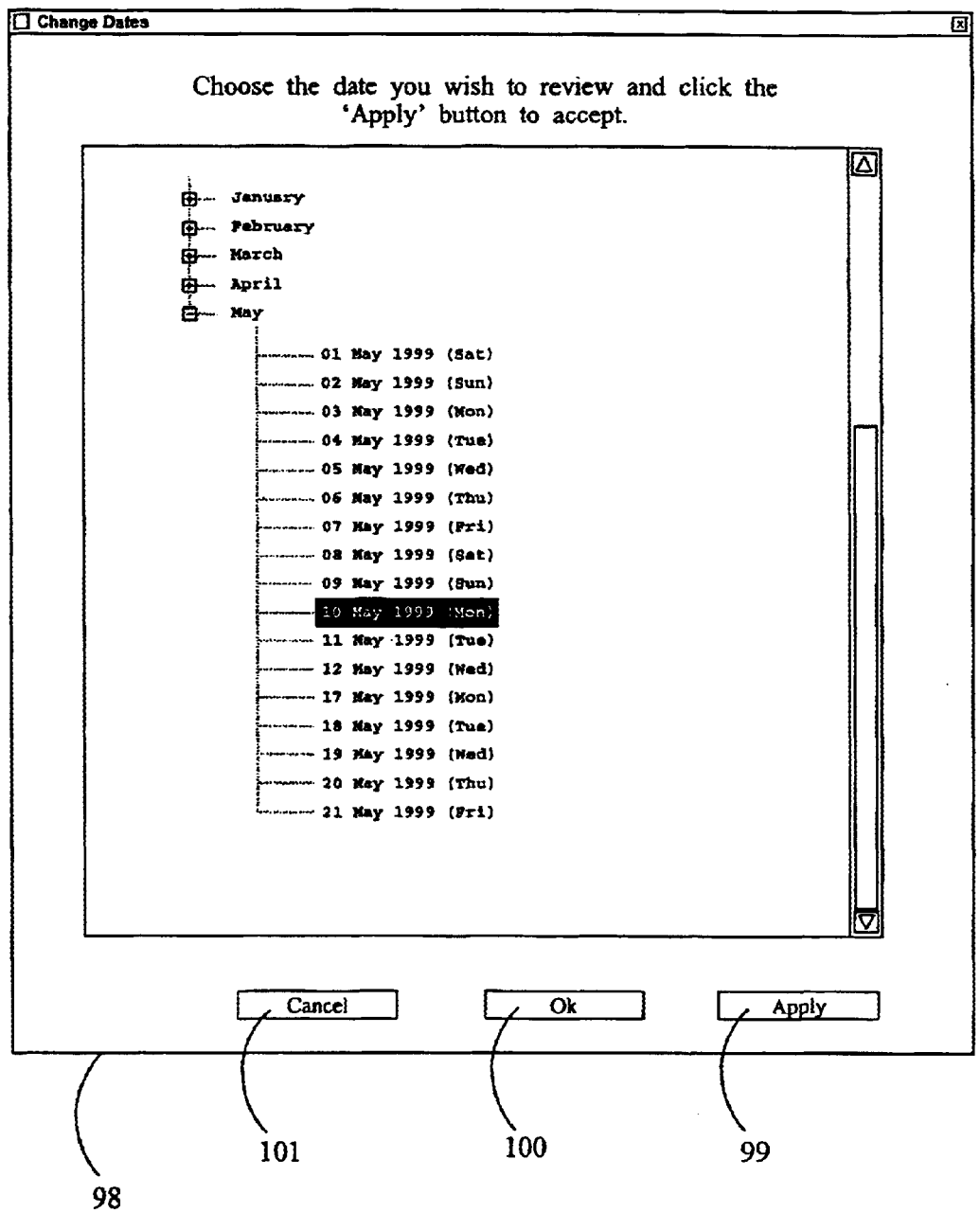

If the ASP 29 or other user selects 'Review Daily Activity' (block 84 in FIG. 5) on the MDI form 77 (FIG. 6), then the MDI process performs the Open-Review-Form task. The Open Review Form task calls the review process (block 84), which operates within the constraints of a 32-bit normal Visual Basic form. An exemplary computer screen display of a Visual Basic® 5.0 form layout 102 for the 'Review Daily Activity' operation (block 84 in FIG. 5) is illustrated in FIG. 9. The form 102 is launched by the configuration utility 58 and loaded into the workstation's memory. The form 102 displays the status of the loader application 60 for a date selected by the user or ASP 29. In fact, the 32-bit, Visual Basic® 5.0 form layout 98 (illustrated in FIG. 8) is immediately displayed on top of the layout 102. The form layout 98 is a modal form that requires a user to select one of the dates (block 106 in FIG. 5) from the Tree View display (for different months in a year) before the user can access the review process form layout 102. In one embodiment, the current date may be the default date highlighted on the form layout 98. The user may select any other date as shown in FIG. 8.

Thus, the review process (block 84 in FIG. 5) includes a sub-process referred to herein as the change date process and represented by blocks 106, 107 and 108 in FIG. 5. The change date process operates within the constraints of a normal Visual Basic form—the change date form 98. The change date form 98 is launched by the review process and loaded into the workstation's memory. The change date form 98 displays the dates of processing associated with the loader application 60 and found in the Download_Schedule table in the LoaderDW.DAT SQL database 68. The Tree View control is used to display the Year of processing with a first group of sub-nodes containing the month and a second group of sub-nodes (within the first group of sub-nodes) containing the actual dates in a selected month.

Once the user or the ASP 29 selects a date from the change date form layout 98, the user may click one of the three "buttons." When the user clicks the 'Apply' button 99, the review process (generally represented by block 84 in FIG. 5) performs the Review-Update task. In the Review-Update task the configuration utility 58 accesses the SQL server 32, retrieves from the Download_Schedule table in the LoaderDW database 68 the process status values for the loader application 60 for the date selected by the user, and displays the results on the NT workstation 34 via the review process form layout 102 (block 107 in FIG. 5). In other words, the earlier loaded (but displayed behind the change date process form layout 98) review process form 102 is brought forward on the workstation screen with requested data displayed therein and the change date form layout 98 is sent behind the review process form 102 on the workstation display. Thus, the change date form layout 98 still remains visible and loaded in the workstation's memory after the manual click of the 'Apply' button 99.

Once the review process form layout 102 becomes accessible to the user (because of its being displayed in front of the change date process form 98), the user may click one of the three "buttons" displayed thereon. If the user clicks the 'Print' button 104, the review process performs the Print-Screen task (block 89 in FIG. 5) and prints the data displayed on the form layout 102 to a designated printer, e.g., the printer 90 (FIG. 5). If the user clicks the 'Cancel' button 105, the review process performs the Termination-Form task (block 108 in FIG. 5) and unloads the review process form layout 102 from the workstation's memory. In other words, the review process form 102 is no longer displayed on the workstation screen. However, the change date process form layout 98 still remains displayed on the screen and the user may select another date from that form and click either the 'Ok' button 100 or the 'Apply' button 99 to instruct the review process to reload the review process form layout 102 and display thereon the results for the selected date.

If the user clicks the third button (i.e., the 'Change Date' button 103) on the review process form layout 102, then the review process performs the Change-Date task, which launches the change date process (blocks 106, 107 and 108 in FIG. 5) described hereinbefore. Again, the review process form 102 is sent behind or displayed behind the change date process form 98 on the workstation's display. If the user or the ASP 29 selects the current date on the change date process form layout 98 and clicks the 'Ok' button 100 or the 'Apply' button 99, the review process displays the status of the loader application 60 for the current date. In doing so, the configuration utility 58 accesses the SQL server 32, retrieves the process status values for the loader application 60 for the current date from the Current_Day_Schedule view of the Download_Schedule table in the LoaderDW database 68, and displays the results on the NT workstation 34 via the review process form layout 102 (block 107 in FIG. 5). When the Current_Day_Schedule view (in the LoaderDW database 68) has no entries, i.e., when it is empty, the review process form layout 102 displays a message box containing therein a "No Activity For The Day" message.

Referring to the change date process form 98 in FIG. 8, it is noted that when the user or the ASP 29 manually clicks the 'Ok' button 100, the review process performs the Review-Update and the Termination-Form tasks. The Termination-Form task is performed for the change date process and the change date process form 98 is unloaded from the workstation's memory. This results in the removal of the change date process form 98 from the workstation's display (not shown). However, the Review-Update task is performed for the review process form 102 and the process status values of the loader application 60 are retrieved (from the LoaderDW database 68) and displayed on the review process form 102. In other words, only the review process form 102 containing process status values for the date selected on the change date process form 98 (prior to the clicking of the 'Ok' button 100) remains displayed on the workstation screen. The user may only access the 'Cancel' button 105 or the 'Print' button 104 on the review process form 102 in such a situation. The 'Change Date' button 103 may be deactivated by the review process. In other words, the user may not obtain process status data for any other date once the 'Ok' button 100 is clicked.

If, instead, the user clicks the 'Cancel' button 101 on the change date process form 98, then the review process performs the Termination-Form task for the review process as well as its sub-process, i.e., the change date process. As a result, both of the displayed forms—the change date process form 98 and the review process form 102—are removed from the display as their corresponding processes are unloaded from the workstation's memory. The Termination-Form task is represented by block 108 in FIG. 5. The multi document interface form 77 (FIGS. 6, 9) may still be visible on the workstation's display to allow the user to reload the review process if so desired.

In one embodiment, the configuration utility 58 connects to the SQL server 32 (and, hence, to the LoaderDW database 68) using a Remote Data Object (RDO) library distributed with the Microsoft Visual Basic® software. Connection to the SQL server 32 may be required when the user or the ASP 29 clicks the 'Ok' button 100 or the 'Apply' button 99 on the change date process form layout 98 (FIG. 8) as described hereinbefore. The RDO library may contain calls and routines that allow a Visual Basic program, e.g., the configuration utility 58, to connect to a server or a database, including a Microsoft Access® database or a FoxPro® database. The following functions may be performed by the RDO: (1) Create a Connection Object and supply it with SQL server user's ID and password (if established) as well as with the name of the SQL server to which a connection is desired. This establishes the connection with the SQL server 32. (2) Create a Database Object from the Connection Object and supply the name of the database (here, the name assigned to the LoaderDW database 68) to the Database Object. (3) Execute Update Queries from the Database Object. Update Queries are sent to search and retrieve desired data from the LoaderDW database 68. For example, an Update Query may search all the dates contained in the Download_Schedule table in the LoaderDW database 68 to retrieve process status data for the loader application 60 for a date selected by the user on the change date form 98. (4) Close the Connection Object. This severs the connection between the SQL server 32 and the configuration utility 58.

In an alternative embodiment, an Active Data Object (ADO) in the Microsoft Visual Basic library may be used instead of the RDO to perform the same functions as performed by the RDO and described hereinabove. In a still further embodiment, a Data Access Object (DAO) in the Microsoft Visual Basic library may be used (by the configuration utility 58) with an ODBC (Open Database Connectivity) bypass to establish a connection to the SQL server 32. The ODBC bypass allows a Visual Basic program to "talk" to other databases, e.g., the LoaderDW database 32 in the SQL server 32. However, if the configuration utility 58 needs access to a Microsoft Access® database, then the DAO may be used without the ODBC bypass.

Figure 1:
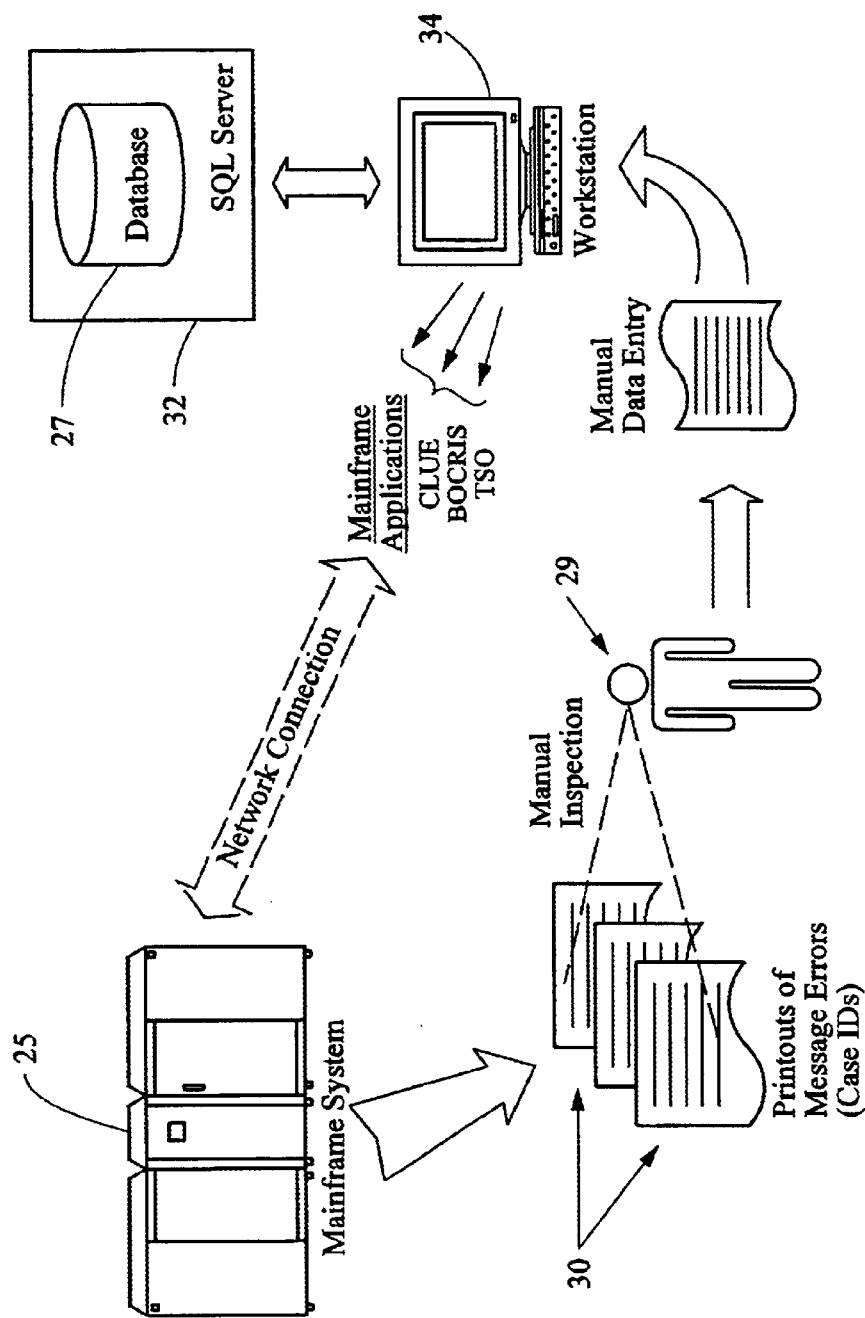
FIG. 1 illustrates a prior art scheme to transfer data from a mainframe computer system in a telephone service provider's regional service center to a central database in a central processing facility.
Figure 2:
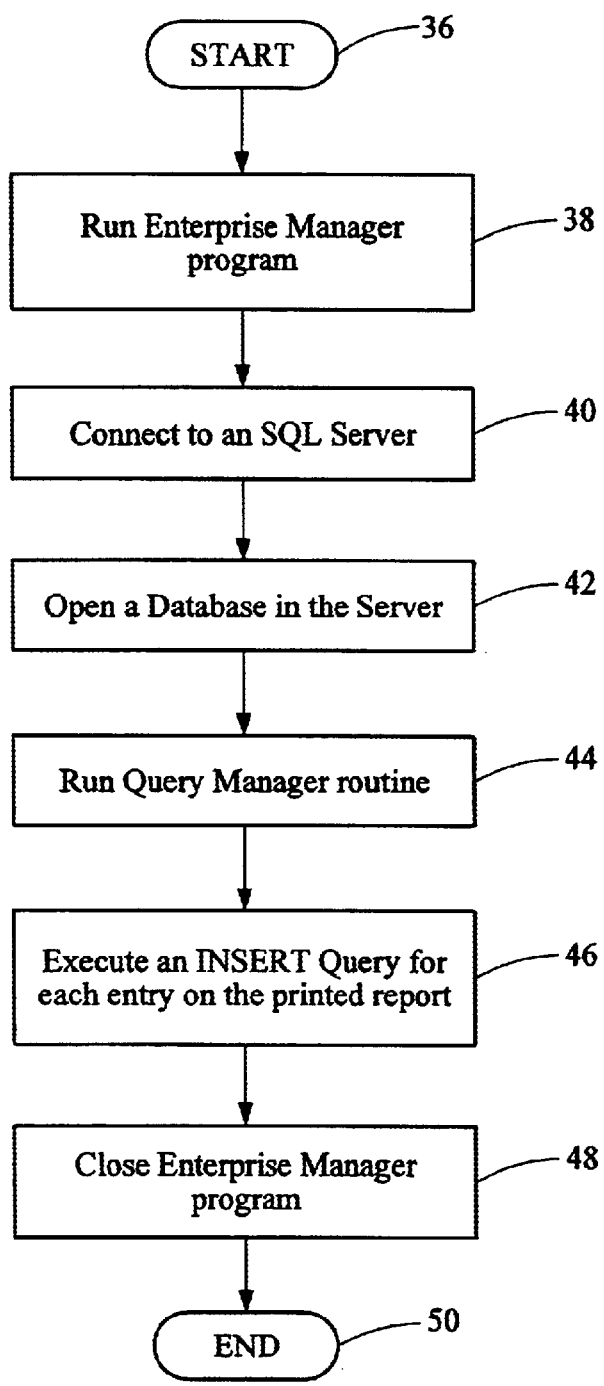
FIG. 2 outlines the steps involved when an operator manually enters data from data printouts into a database using a workstation.
Figure 10:
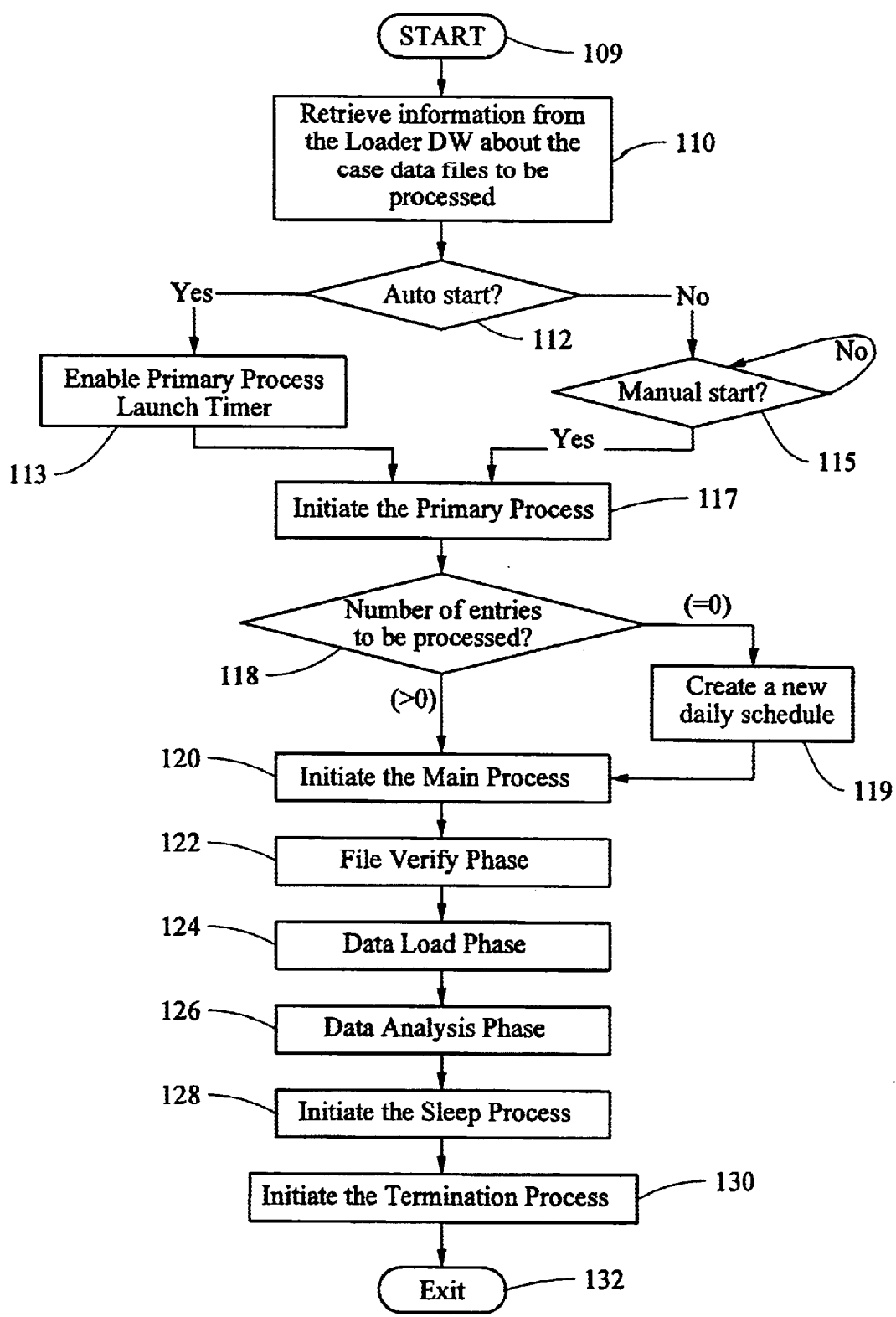
FIG. 10 shows an exemplary flowchart for the functionality of the loader application.

FIG. 10 shows an exemplary flowchart for the functionality of the loader application 60. A purpose of the loader application 60, as mentioned hereinbefore, is to provide a method for automatically importing data stored in a standard ASCII data file (residing in the case data file storage 66 in the mainframe computer system 25) into a data container-type software database, e.g., the LoaderDW.DAT SQL database 68 or a Microsoft Access database created on the workstation 34. The LoaderDW database 68 may have internal backup capability and may be useful in a multi-user environment (e.g., in a TSP's central telephone billing/account management office). The data to be imported from a remote mainframe system may be in other data formats, e.g., in the BCD (Binary Coded Decimal) form or in the EBCDIC (Extended BCD Interchange Code) form. The loader application 60 further provides a method for storing analysis queries for the imported data within the same LoaderDW database 68. Thus, as mentioned hereinbefore, the loader application 60 saves numerous hours of manual data entry work currently being performed to load mainframe data into a local server database as discussed hereinbefore with reference to FIGS. 1 and 2.

The loader application 60 is an executable file in Microsoft Visual Basic with manual or automatic startup capability for the functionality performed by the loader application 60. The automatic startup capability may be achieved through an application scheduler utility supported by the Windows NT® operating system and running on the workstation 34. The following list represents the processes that may constitute the loader application's functionality: (1) Application Load Process (blocks 110, 112, 113 and 115); (2) Primary Process Launch Timer; (3) Primary Process (block 117); (4) Lead Process (blocks 118 and 119); (5) Main Process (blocks 120, 122, 124 and 126); (6) Sleep Process (block 128); (7) Termination Process (block 130); and (8) Performance Tracking Process A file directory locally created in the workstation's 34 memory (preferably, the non-volatile memory) may contain the executable file for the loader application 60 as well as the initialization file 61 for the loader application 60. As noted hereinbefore, the initialization file 61 for the loader application 60 may contain application setup information (e.g., application startup mode (i.e., manual startup or automatic startup), the shutdown time (in 'hh:mm:ss') for the loader application 60, etc.) stored therein by the configuration utility 58 (or manually by the user) and used by the loader application 60 during processing. The user or the ASP 29 may manually "run" the loader application 60 by executing its executable file at block 109.

The Application Load Process at block 110 begins after the 'Run' command is issued for the loader application 60. As part of the Application Load Process, the loader application 60 loads a primary process form 111 (FIG. 11) into the workstation's memory (typically, the non-volatile memory) and displays it on a display (not shown) for the workstation 34. In one embodiment, the primary process form 111 is a 32-bit, Microsoft Visual Basic® 5.0 form. After loading the primary process form 111 in the workstation's memory, the loader application 60 establishes a temporary connection to the LoaderDW database 68 using, for example, the remote data object (RDO) as discussed hereinbefore. The loader application 60 then retrieves from the Download_Schedule table (in the LoaderDW database 68) the information about the files to be processed (block 110) and displays the retrieved information on the primary process form layout 111. Thereafter, the connection to the LoaderDW database 68 is terminated.

After disconnecting from the LoaderDW database 68 (i.e., from the SQL server 32), the Application Load Process checks the value of the AutoStart field (discussed hereinbefore) in the loader application's initialization file 61 at decision step 112. If the value is "true", the Application Load Process enables the Primary Process Launch Timer at block 113. A "true" value in the AutoStart field indicates that the user has selected automatic startup capability for the loader application 60. However, if the value is "false", then the Application Load Process concludes and the loader application 60 remains idle until a clicking of the 'Start Load' button 114 is received at block 115 as described hereinbelow. No further processing may be performed by the loader application 60 during this Application Load Process.

In one embodiment, the Primary Process Launch Timer (or, simply, the "timer") is a Microsoft Visual Basic® control that is used in the loader application 60 to initiate the Primary Process at block 117. At design time of the loader application 60, the timer's 'Enabled' property may be set to "false" so that the timer can be automatically enabled by the Application Load Process (block 113 in FIG. 10) when the AutoStart field contains a "true" value (as discussed hereinbefore). Once automatically enabled, the timer first disables itself in order to prevent additional executions thereof and then initiates the Primary Process at block 117. However, if the value in the AutoStart field is "false", then the timer performs the click event of the 'Start Load' button control 114. In other words, the timer, using its 'Interval' property, periodically monitors at decision block 115 whether the 'Start Load' button 114 has been clicked by the user (or the ASP 29)—manually or under another program control. In one embodiment, during design of the loader application 60, the timer's 'Interval' property is set to ten nano seconds (10 ns) to accomplish frequent "scanning" of the status of the 'Start Load' button 114.

The TSP (telephone service provider) may specify automatic data loading activity every night to avoid disturbing regular accounting and billing processing during daytime (e.g., during regular business hours). In such a situation, the initialization file of the loader application 60 may contain a "true" value for the AutoStart field. The loader application 60 may be configured to start data loading activity every night beginning at 12:00 a.m. and to cover all data files ready to be processed at remote mainframe computer systems. An exemplary list of remote geographic "sites" (or, mainframe systems) accessed by a loader application (e.g., the loader application 60) in a TSP's telephone network is illustrated in the left-hand column of the primary process form 111 in FIG. 11.

Figure 11:
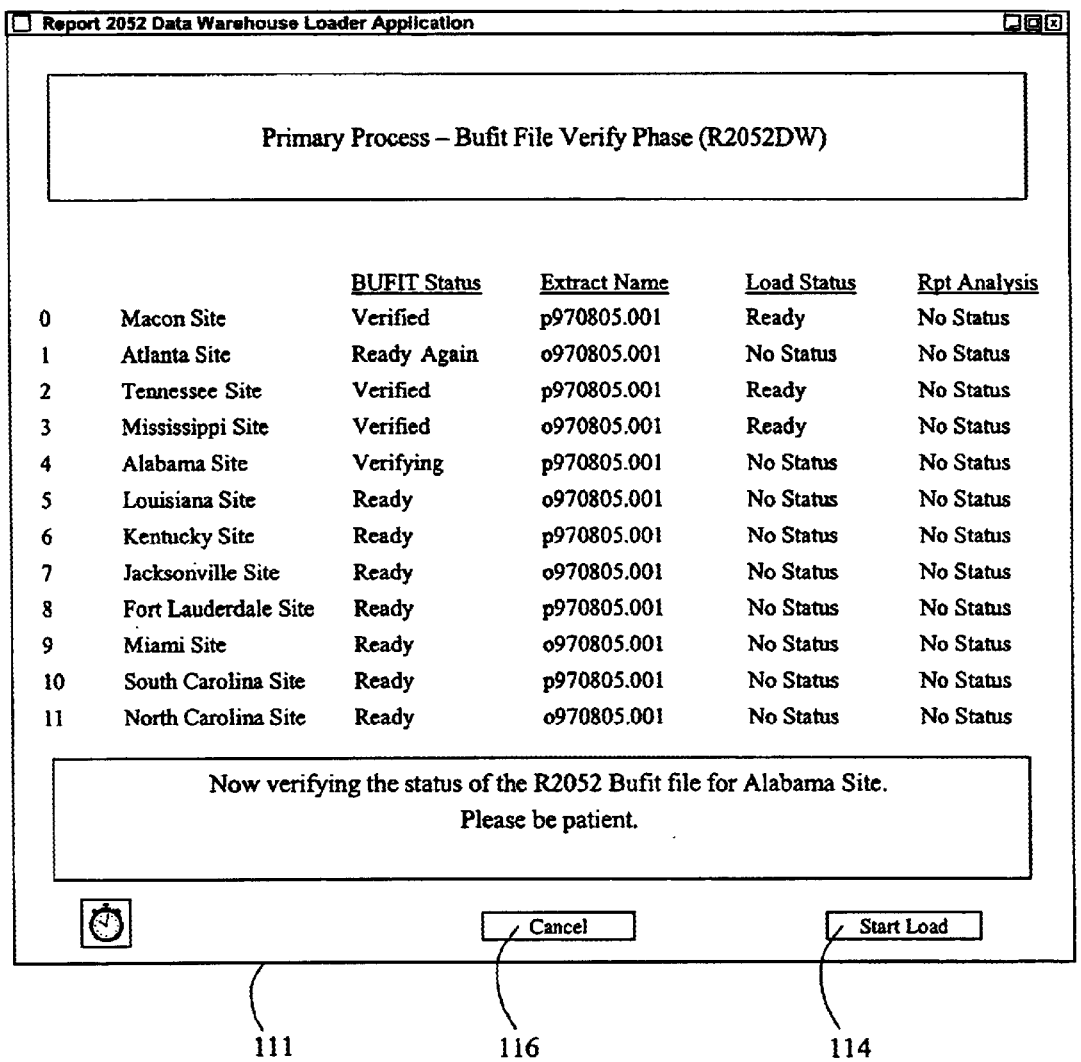
FIG. 11 is a computer screen display of a Visual Basic® form layout used to perform the primary process in the loader application.

The execution of the Primary Process at block 117 may be initiated either by the Primary Process Launch Timer or by the manual click of the 'Start Load' button 114 (FIG. 11). The Primary Process may operate within the constraints of only the primary process form 111. The user or the ASP 29 may terminate the Primary Process (and, hence, the loader application 60) by manually clicking the 'Cancel' button 116 on the primary process form 111. The Primary Process at block 117 initiates and manages performance of the Lead Process (blocks 118, 119), the Main Process (blocks 120, 122, 124 and 126), the Sleep Process (block 128) and the Termination Process (block 130).

At decision block 118, the Lead Process first evaluates the number of entries in the Current_Day Schedule view of the Download Schedule table in the LoaderDW database 68 using, for example, the RDO (Remote Data Object) to connect to the SQL server 32 (and, hence, to the LoaderDW database 68) as discussed hereinbefore. If the number of entries is greater than zero, then the Main Process at block 120 starts and the Lead Process successfully concludes. In other words, the Main Process at block 120 may be initiated only when there is data to be loaded (or processed) from at least one remote site or mainframe computer. If the number of entries in the Current_Day_Schedule view is equal to zero (i.e., when the Current_Day_Schedule view is empty), then the Lead Process at block 119 creates a new daily schedule in the Current_Day_Schedule view (and, hence, in the Download_Schedule table) by performing a Create-New-Schedule task and thereafter initiates the Main Process at block 120. The creation of this new daily schedule may be accomplished using an INSERT action query as described hereinbelow. If the Lead Process encounters any errors accessing the LoaderDW database 68 or accessing the data in the LoaderDW database 68, then the Lead Process unsuccessfully concludes with an appropriate Error Notification message box displayed on the workstation's 34 display screen.

As mentioned hereinbefore, the Lead Process references the Current_Day_Schedule view, which is an SQL view object that may be created using the following pseudo code:
   SELECT * from Download_Schedule
      where Create_Date=GetDate( )
The GetDate( ) command may retrieve the current system date (i.e., the date of processing of data files from remote sites) as its argument, and all the fields (denoted by '*' in the pseudo code given above) in the Download_Schedule table having date of creation (Create_Date) equal to the current date (i.e., the processing date) are thus placed in the Current_Day_Schedule view object. In other words, the Current_Day_Schedule view object is a query of the Download_Schedule table consisting of only those records that have the Create_Date field equal to the date of data processing.

In the embodiment where the loader application 60 automatically starts the data loading activity every midnight (12 a.m.) for all the sites handled by the loader application 60, the Download_Schedule table may have zero records every midnight under the current date, i.e., the Current_Day_Schedule view may be empty every midnight prior to the beginning of data processing by the loader application 60. This may be because no data processing has yet begun at 12 a.m. for that day. The Create-New-Schedule task performed by the Lead Process at block 119 first creates a number of records in the Current_Day_Schedule view of the Download_Schedule table equal to the total number of entries (i.e., sites) in the Site_Information table stored in the LoaderDW database 68. For example, the primary process form 111 shows twelve sites handled by the loader application 60 in one embodiment of the present invention. The Site_Information table in that embodiment may thus have twelve entries—one for each site in the TSP's network. The Create-New-Schedule task may thus create twelve entries in the Current_Day_Schedule view with each entry having a number of predetermined fields associated therewith (discussed hereinbelow with reference to FIG. 12). In other words, Current_Day_Schedule view may be recreated in the LoaderDW database 68 every night at midnight.

The following pseudo code may be executed by the Create-New-Schedule task when the Current_Day_Schedule is empty:

---

SELECT * [i.e., all fields] from the Current_Day_Schedule view
   IF Current_Day_Schedule is empty
      INSERT into Current_Day_Schedule from Site_Information
   END IF
BEGIN Processing

---

The Lead Process (through the Create-New-Schedule task) thus uses the 'INSERT' query to reference and access the Current_Day_Schedule view in the LoaderDW database 68. The entries inserted into the Current_Day_Schedule view correspond to each site contained in the Site_Information table.

FIG. 12 shows a table 134 containing some exemplary fields created by the loader application 60 (via the Create-New-Schedule task) as part of the Current_Day_Schedule view. FIG. 12 illustrates an embodiment where fifteen fields are created for each site (i.e., per remote mainframe computer system) in the TSP's network. Some of the fields (e.g., the File_Name field, the Create_Date field, etc.) in the Current_Day_Schedule view are taken from the Download_Schedule table. These fields are repeated for each site in the Site_Information table. The Site_Information table may be different for each loader application in use in the TSP's data processing facility. For example, if one loader application handles four sites (e.g., Atlanta, Tennessee, Mississippi and Alabama), then its corresponding Site_Information table has four entries (sites) therein. However, if another loader application handles ten sites, then its Site_Information table will correspondingly contain ten entries. The Site_Information table in the LoaderDW database 68 thus maintains a record of site-related information, e.g., how many sites (mainframe systems) are present in the TSP's network and handled by the corresponding loader application.

In the discussion given hereinbelow, the following numerical values are used to describe the processing status of associated tasks. Number zero ('0') indicates that the task is "in progress", i.e., the task is "being processed". A negative one value ('−1') for a task indicates that the task is "ready to be processed" or "ready to be processed again" (if not successfully processed earlier). A negative two value ('−2') for a task indicates that the task is "not ready to be processed." A numerical one value ('1') for a task indicates that the "processing of the task was successful." Finally, number two ('2') for a task indicates that the "processing of the task was unsuccessful."

The default values for the Site_ID, Site_Code, Site_Description and Previous_File_Name fields for each site handled by the loader application 60 may be taken from the Site_Information table in the LoaderDW database 68. The Previous_File_Name field for each site (i.e., for each remote mainframe computer system) may contain the name of the corresponding file from that site last copied (into the NT server 70) by the loader application 60. In one embodiment, the Previous_File_Name field for a site may be the name of the file copied from that site during the loader application's midnight operation the previous night. As indicated in the table 134 in FIG. 12, the File_Name field is initially empty because the Main Process at block 120 in FIG. 10 (described hereinbelow) hasn't yet started. The loader application 60 (through the Main Process at block 120) determines the name of the file to be copied from a given site (e.g., the mainframe computer system 25 in FIG. 4) for the current date (given by the Create_Date field). Other fields represented in the table 134 are self-explanatory. However, additional discussion of relevant fields is provided hereinbelow as part of the description of the data load process.

The Main Process at block 120 initiates and manages the performance of the following phases of the data loading process handled by the loader application 60: (1) The File Verify phase at block 122; (2) The Data Load phase at block 124; and (3) The Data Analysis phase at block 126.

The File Verify phase at block 122 is performed by looping through the Current_Day_Schedule view (table 134 in FIG. 12) of the Download_Schedule table. Each entry (i.e., for each mainframe system handled by the loader application 60) possessing a Verify_Status field having a '−1' value (ready to verify for the first time) in the Current_Day_Schedule view is sorted in descending order based on the value in the Verify_Start_Time (table 134 in FIG. 12) for each entry. In one embodiment, it may be possible that the Verify_Start_Time field for each site may contain the current date or any other identical default time (e.g., 12:30:00 a.m.). In such an event, the loader application 60 may randomly select an order in which it would process data files from the remote sites. Alternatively, the loader application 60 may be preprogrammed with the desired order of data file loading. For example, one site may usually generate large case data files while another site may typically have a smaller case data file. The software designer may wish to initiate processing of the large case data file sooner than the smaller one and may thus incorporate such considerations in the design of the loader application 60 as well as in the Current_Day_Schedule view in the LoaderDW database 68. A user (e.g., the ASP 29) may also be given authority to modify the values in the Verify_Start_Time in the Current_Day_Schedule view as desired.

If there is no file verification required (e.g., when the Verify_Status field contains a value other than '−1'), then the Data Load phase at block 124 starts and the File Verify phase at block 122 concludes. However, if the File Verify phase is left to continue, the following tasks are performed: (1) The Set-Status-To-Verifying task; (2) The FTP(File Transfer Protocol)-Remote-Computer-Login task; (3) The Locate-Most-Current-File task; (4) The FTP-Most-Current-File task; (5) The File-Delete task; and (6) The Set-Load-Status task.

The Set-Status-To-Verifying task is performed by updating the Verify_Status field for this entry (or site) to the value of zero ('0'). This value indicates that this entry is currently being verified by the loader application 60. The BUFIT Status column in FIG. 11 represents the values in the Verify_Status field for the pertinent site. For example, a value of zero ('0') may indicate "Verifying" on the primary process form 111 being displayed on the screen of the workstation 34. The "Verified" message may correspond to a value of '1' in the corresponding Verify_Status field. The "Ready" message corresponds to a value of '−1' in the Verify_Status field. The "Ready Again" message (number '−1' in the Verify_Status field) may represent that the data file from the corresponding entry (or site) has not been located (under the Locate-Most-Current-File-Task described hereinbelow) and hence the site needs to be verified again in the next iteration of the loader application 60. Thus, the loader application 60 may again "take up" the Atlanta site (FIG. 11) only after each remaining site listed below it in the order given in FIG. 11 has been verified once (whether successfully or not).

During Set-Status-To-Verifying task, the Verify_Start_Time field for each site is updated (or "stamped") to the then-current system date and time so that the loader application 60 may identify the sites that still remain to be verified. For example, a site with the "oldest" timestamp (e.g., 12:30:00 a.m.) or with a pre-assigned value in the Verify_Start_Time field (at the beginning of the File Verify phase) may be verified before a site with a relatively "newer" timestamp (e.g., 12:42:05 a.m.) or a site that is "Ready Again".

Figure 13:
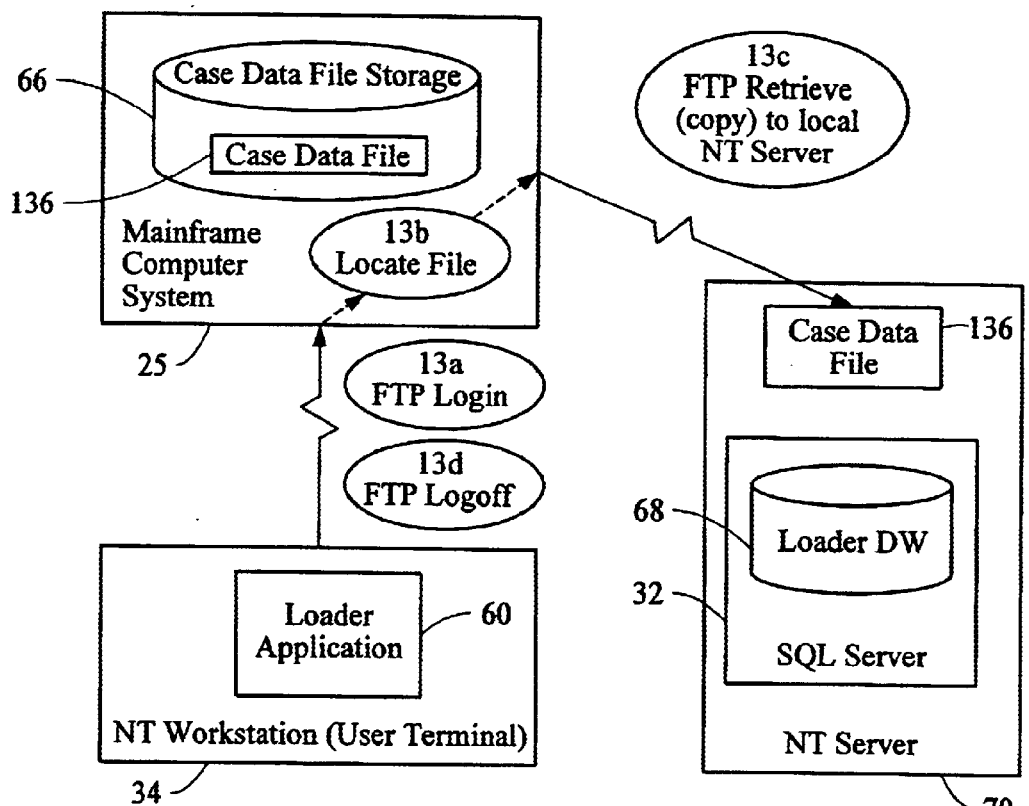
FIG. 13 generally illustrates the steps involved in transferring a data file from a mainframe computer system to a local server using the loader application.

FIG. 13 generally illustrates the steps involved in transferring a data file from the mainframe computer system 25 to the local server 70 using the loader application 60 of the present invention. FIG. 13 depicts the FTP-Remote-Computer-Login task, the Locate-Most-Current-File task and the FTP-Most-Current-File task performed under the File Verify phase (block 122 in FIG. 10) of the Main Process.

In the FTP-Remote-Computer-Login task, the loader application 60 may issue the FTP Login command at step 13a to the remote mainframe computer system 25 supplying the remote user's (e.g., the ASP 29) ID and password to the mainframe system 25. FTP or file transfer protocol is a client-server protocol which allows a user on one computer (e.g., the client computer) to transfer files to and from another computer (e.g., the server computer) over a computer network, e.g., a TCP/IP (Transmission Control Protocol/Internet Protocol) network or the Internet. In the arrangement illustrated in FIG. 13, the mainframe computer system 25 may function as an FTP server whereas the NT server 70 may function as an FTP client that may be "operated" through its associated workstation 34. Thus, a user may accomplish file transfer from the mainframe system 25 to the NT server 70 using the loader application 60 on the workstation 34. In one embodiment, all FTP commands described herein are performed using the PowerTCP control software by Dart Communications of 111 Dart Circle, Rome, N.Y., USA 13441. If the FTP-Remote-Computer-Login task fails for any reason (e.g., invalid user ID or password), the Verify_Status field (in the Current_Day_Schedule view) for a site (e.g., the Miami site in FIG. 11) is updated to the value of '−2'. This value indicates to the user that a "Verification Error" has occurred.

The Locate-Most-Current-File task at step 13b in FIG. 13 may depend on the success of the FTP-Remote-Computer-Login task. In the Locate-Most-Current-File task, the loader application 60 may first issue the FTP-Directory-Listing command to the remote mainframe system 25 supplying the name of a source directory (in the NT server 70) where the mainframe system 25 may store the results (i.e., a list of all case data files and corresponding directories present in the mainframe system 25). These results are stored into a string variable in a source directory in the NT server 70. The loader application 60 identifies the source directory in the NT server 70 by accessing the loader DW database 68 to "read" the name of the source directory stored within the Source_Dir field in the Load_Type table in the LoaderDW database 68. The value in the Source_Dir field may have been placed there from an earlier input by the user entering data through, for example, the Source Directory Path field on the configuration form layout 85 in FIG. 7.

The loader application 60 also obtains the name of the last file processed from the Previous_File_Name field in the Current_Day_Schedule view (table 134 in FIG. 12). Furthermore, the loader application 60 consults the Site_Code field in the Current_Day_Schedule view (shown in table 134 in FIG. 12) to obtain a single-character site code associated with the data file to be processed from the given site (here, the mainframe system 25). Thereafter, the loader application 60 attempts to locate the most recently created data file name (i.e., the case data file to be copied) from the data stored in the string variable.

In one embodiment, each case data file is named according to a predefined naming syntax. Some exemplary data file names are shown in FIG. 11 under the column titled 'Extract Name.' The naming syntax for each data file begins with a single character (stored in the Site_Code field in the Current_Day_Schedule view) representing the file's site affiliation. The single character is followed by the file's creation date (formatted as 'yymmdd'), a period (.) and the creation time (formatted as 'hhm'). Each mainframe computer system may create at midnight the case data file to be processed by the loader application 60 that night. The time of creation for such case data files may be '001' for each site. As an example, the complete file name for the most recently created case data file from the Atlanta Site (Site_ID=01) may be 'o970805.001' as shown in FIG. 11. The date of creation for this file is Aug. 5, 1997.

The loader application 60 looks for the most recently created file from all the file names received from the mainframe system 25 and stored in the source directory in the NT server 70. A quick comparison of the date in the Previous_File_Name field and the dates contained in the file names received from the remote site (in response to the FTP-Directory-Listing command) allows for identification of the name of the most recent file to be processed. For the Atlanta Site, as an example, the value in the Previous_File_Name field may be 'o970804.001'. The lower date boundary (970804, i.e., Aug. 4, 1997) in the Previous_File_Name field is used to determine the name of the latest data file (i.e., the 'o970805.001' file (shown in FIG. 11)) the loader application 60 needs to look for in the file record received from the mainframe system for the Atlanta Site. If the file is not located in the source directory received from the remote site, the Verify_Status field for that site in the Current_Day_Schedule view is updated to a '−1' value, which indicates that the loader application 60 is "Ready to Verify Again" in its next iteration as discussed hereinbefore.

The FTP-Most-Current-File task may depend on the success of the Locate-Most-Current-File task. The FTP-Most-Current-File task first issues at step 13c the FTP command to the mainframe computer system 25 to copy the case data file identified under the Locate-Most-Current-File task (e.g., the case data file 136 in FIG. 13) to a destination directory in the NT server's 70 memory. The loader application 60 identifies the destination directory in the NT server 70 by accessing the loader DW database 68 to "read" the name of the destination directory stored within the Dest_Dir field in the Load_Type table in the LoaderDW database 68. The name of the destination directory may be user-specified and the value in the Dest_Dir field may have been placed there from an earlier input by the user entering data through, for example, the Destination Directory Path field on the configuration form layout 85 in FIG. 7. After the data file 136 has been copied, the FTP-Most-Current-File task issues at step 13d the FTP Logoff command to the remote mainframe system 25, terminating the network connection between the server 70 (and, hence, the workstation 34) and the mainframe system 25.

The File-Delete task may be dependent on the success of the FTP-Most-Current-File task. After logging off from the mainframe system 25, the loader application 60 deletes (using the File-Delete task) all file names (received from the mainframe computer 25) in the source directory on the NT server 70. The File Name field in the Current_Day_Schedule view (table 134 in FIG. 12) may be updated to contain the name of the located file and its extension, i.e., the complete name of the case data file 136. For example, for the Atlanta Site, the File_Name field may contain 'o970805.001'. Two considerations are applied to prevent deletion of the file name of the most current case data file, i.e., data file 136. First, the 'to-be-deleted file name' may need to match the Site_Code value (e.g., letter "o" for the Atlanta Site) plus the '*.*' mask. The '*.*' mask selects all file names bearing the same Site_Code value. Second, the 'to-be-deleted file name' may not equal the value of the File_Name field. Thus, in the previous example for the Atlanta Site, all the file names except for the file name 'o970805.001' may be deleted from the local server's 70 source directory.

The Set-Load-Status task may depend on the success of the other tasks mentioned hereinabove as part of the discussion of the File Verify phase of the Main Process performed by the loader application 60. If all the tasks are successfully performed, the Verify_Status field in the Current_Day_Schedule view (table 134 in FIG. 12) is updated to contain '1' therein. This value indicates to the user that the file name mentioned in the Extract Name column (in the display layout 111 in FIG. 11) for a given site (e.g., the Tennessee Site) has been "Verified" (as indicated under the BUFIT Status column in FIG. 11). Furthermore, the Verify_Stop_Time field in the Current_Day_Schedule view (table 134 in FIG. 12) is updated to the then-current system date/time to indicate when the file verification was over. The Load_Status field (FIG. 12) is also updated to the value '−1' to indicate that the associated case data file (here, data file 136) is "Ready to Load". A "Ready" message may appear under the Load Status column (in the display layout 111 in FIG. 11) against the corresponding site (e.g., the Tennessee Site).

The Data Load phase at block 124 (FIG. 10) involves data transfers between the local server 70 and the user terminal 34. Connection or access to mainframe system 25 is not needed during this phase. The Data Load phase may be performed by looping through the Current_Day_Schedule view (FIG. 12) of the Download_Schedule table and identifying each entry (or site) possessing a Load_Status equal to '−1' (i.e., "Ready to Load" that file whose name is contained in the File_Name field). If there are no such entries, then the Data Analysis phase at block 126 (FIG. 10) may start and the Data Load phase may conclude. However, if there is any file that is ready to be loaded (e.g., the case data file 136), the Data Load phase loads the data from that file into the LoaderDW database 68. The Data Load phase may perform the following tasks: (1) The Set-Status-To-Loading task; (2) The Empty-Case-Tables task; (3) The Open-Data-Table task; (4) The Open-Case-Data-File task; (5) The Get-Parsing-Rules task; (6) the Load-Data-Into-Database task; and (7) The Set-Analysis-Status task.

The Set-Status-To-Loading task is performed by accessing the LoaderDW database 68 (using the workstation 34) and updating the Load_Status field (shown in the table 134 in FIG. 12) for the given site (here, the mainframe system 25 that may represent, for example, the Tennessee Site in FIG. 11) to the value zero ('0'). This value indicates to the user (through the Load Status column in the display layout 111 of FIG. 11) that the loading of the case data file 136 is currently being performed by the loader application 60 for the remote site 25. Similarly, the Load_Start_Time field (shown in the table 134 in FIG. 12) may be updated to reflect the then-current system date/time. The Load_Start_Time informs the user when the data loading operation was started by the loader application 60.

The Empty-Case-Tables task is performed by accessing the LoaderDW database 68 (from the user terminal 34) and truncating (or deleting) pre-existing data from the appropriate Data Tables and Analysis Tables in the LoaderDW database 68 in preparation for the Load-Data-Into-Database task. This deletion of earlier processed data may be necessary to efficiently utilize limited storage space available in the LoaderDW database 68 for storage of new (i.e., unprocessed) data and analysis queries.

In the Open-Data-Table task, the loader application 60 accesses the LoaderDW database 68 and opens the appropriate Data Table therein in preparation for the Load-Data-Into-Database task. The Data Table to be opened for the case data file 136 from the mainframe system 25 may be predetermined during database design phase or may be prescribed by the user or the ASP 29 during run-time of the loader application 60.

Figure 14:
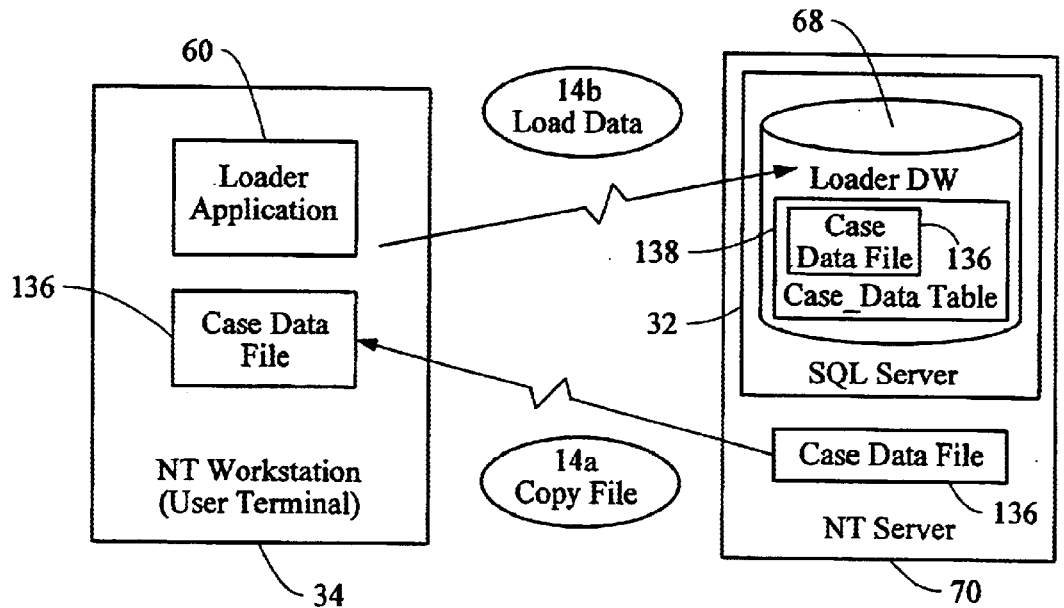
FIG. 14 shows how the loader application loads the data from the data file in the local server into an SQL server database in that local server.

FIG. 14 shows how the loader application 60 loads the data from the data file 136 in the local server 70 into the SQL server database (i.e., the LoaderDW database 68) in the local server 70. FIG. 14, in conjunction with FIG. 15, illustrates the Open-Case-Data-File task, the Get-Parsing-Rules task and the Load-Data-Into-Database task. Broadly speaking, FIGS. 14 and 15 depict a method in which data from the case data file 136 stored in the NT server's 70 memory is transferred to the Loader DW database 68 according to a predetermined set of parsing rules.

The Open-Case-Data-File task accesses the LoaderDW database 68 to read the current value in the File_Name field in the Current_Day_Schedule view (table 134 in FIG. 12). As described hereinbefore, the File_Name field contains the name of the case data file 136. Upon receiving the name of the case data file 136, the Open-Case-Data-File task opens the data file 136 (which is stored in NT server's 70 memory) and stores the data contained therein in workstation's 34 memory in preparation for the Load-Data-Into-Database task. The Open-Case-Data-File task may thus be considered to "copy" the case data file 136 from the NT server 70 to the workstation 34 as depicted by step 14a in FIG. 14.

The case data file 136, as mentioned hereinbefore, may be, for example, an ASCII data file. In one embodiment, the data file 136 may be without any header information (e.g., the case data summary information mentioned hereinbefore with reference to FIG. 1) or without any page breaks between successive pages of data in the data file 136. Alternatively, the case data file 136 may contain header information and page breaks. The loader application 60 may remove the header information and any page breaks when it opens the case data file 136. Therefore, the case data file in the workstation 34 may not be an identical copy of that in the NT server 70. However, the essential case data may still remain the same in both the files. Therefore, for the sake of simplicity of the discussion, the same numeral '136' has been used to identify the case data file in the server 70 (including that loaded in the LoaderDW database 68) as well as that in the workstation 34.

FIG. 15 is an exemplary table illustrating fields in a Parsing_Rules table 140 utilized by the loader application 60 prior to loading the data file 136 into the SQL server database (i.e., the LoaderDW database 68). The Parsing_Rules table 140 may contain detailed rules on how to parse a string of data in the case data file 136. The fields under the Field Name column in the Parsing_Rules table 140 identify the criteria according to which the data in the case data file 136 may be parsed. The Parsing_Rules table 140 may be suitable to parse telecommunication case data generated in a TSP's telephone network. As mentioned hereinbefore, the LoaderDW database 68 may contain the Parsing Rules table 140 and the fields in the Parsing_Rules table 140 may be selected to be loader application-specific. In other words, field names for the loader application 60 may differ from those for other loader applications depending, for example, on the data (e.g., telecommunication billing data, insurance data, medical profile data, etc.) handled by the loader applications.

The Get-Parsing-Rules task accesses the LoaderDW database 68, opens the Parsing_Rules table 140 and stores the parsing information or parsing rules stored therein into a recordset object in preparation for the Load-Data-Into-Database task. The recordset object may be created in the workstation's 34 memory to contain the parsing rules obtained from the Parsing_Rules table 140.

The Load-Data-Into-Database task may loop sequentially through the case data file 136 in the workstation 34 until the end of the file is reached. As discussed hereinbefore, the case data file 136 gets "copied" into the workstation's 34 memory under the Open-Case-Data-File task at step 14a in FIG. 14. The following events may occur for each line of data in the case data file 136 in the workstation 34 while the Load-Data-Into-Database task loops through the case data file 136:

(1) The Load-Data-Into-Database task first reads a line of data from the case data file 136;

(2) The Load-Data-Into-Database task may optionally display a progress bar on the workstation's 34 display screen along with the primary process form 111 (FIG. 11) and adjust the progress bar according to the number of bytes read in the line of data versus the total number of bytes in the data file 136;

(3) The Load-Data-Into-Database task may parse the data string (obtained from reading the line of data from the data file 136) according to the parsing rules retrieved during the Get-Parsing-Rules task; and (4) The Load-Data-Into-Database task may write the parsed information into appropriate fields within a Data Table or Case_Data table 138 in the LoaderDW database 68 as illustrated by step 14b in FIG. 14. This parsed information may generate a new record (in the Data Table) that may be analyzed later by the loader application 60 as discussed hereinbelow. Field details for the Case_Data table 138 are illustrated in FIG. 21. The fields in a Data Table may vary from one loader application to another based on, for example, the type of data being handled by a loader application. The fields in a Data Table may correspond to those in a Parsing_Rules table used by the respective loader application to place data in that Data Table.

After loading data line by line from the case data file 136 (in the workstation 34), the Load-Data-Into-Database task may delete the copy of the case data file 136 residing in the workstation 34. In one embodiment, after successful data loading operation, the Load-Data-Into-Database task may also delete the case data file 136 residing in the NT server's memory, thereby leaving only one copy of the most-recent case data file (i.e., data file 136) stored in the LoaderDW database 68. As discussed herein, loading of data involves only the user terminal 34 and the server 70, and not the remote mainframe system 25. In other words, data are not directly loaded from the remote system 25 to the LoaderDW database 68. This may avoid prolonged use and dependence on the communication network connecting the server 70 and the remote mainframe system 25, freeing the network resources for other needed tasks. Furthermore, the processing resources of the mainframe system 25 may not get wasted in line-by-line data transfer operations, which could be easily performed locally and more efficiently between the server 70 and the workstation 34.

The Set-Analysis-Status task may depend on the success of all of the above tasks performed during the Data Load phase. In the Set-Analysis-Status task, if the data are not loaded successfully, the Load_Status field in the Current_Day_Schedule view (table 134 in FIG. 12) in the LoaderDW database 68 is updated to '2' indicating that an error occurred while loading data. An appropriate error message (for the user) may be displayed under the Load Status column on the primary process form 111 (FIG. 11) for the site involved.

However, if the data loading operation is successful, the Set-Analysis-Status task may update the following fields in the Current_Day_Schedule view (FIG. 12): (1) The Load_Stop_Time field may be updated to the then-current system date/time, i.e., the system date/time when all data from the data file 136 in the workstation 34 is successfully loaded into the LoaderDW database 68; (2) The Load_Status field may be updated to the value of '1' to indicate to the user that the data loading operation was "Successful". A visual indication or message may appear, for example, under the Load Status column on the primary process form 111 (FIG. 11) that is being displayed to the user on the workstation 34; and (3) The Analysis_Status field is updated to the value of '-1' to indicate to the user that the data from the case data file 136, which was previously loaded successfully into the LoaderDW database 68, is now "Ready" to be analyzed by the loader application 60. A visual message, e.g., "Ready" message, may also be displayed under the Rpt Analysis column and for the appropriate site on the primary process form display 111 (FIG. 11).

It is noted that a prior art data mining software, i.e., the MONARCH software from Datawatch Corporation of 175 Cabot Street, Suite 503, Lowell, Mass., USA 01854, may be used to transfer a data file from the workstation 34 to the SQL server 32. However, the MONARCH software requires that the data file to be loaded into the SQL server 32 (and, hence, into the LoaderDW database 68) has to be present in the workstation's 34 memory before the MONARCH software acts on it. In other words, the MONARCH software does not retrieve the data file from a mainframe system and store it in the NT server or the NT workstation as is done by the loader application 60. Furthermore, the MONARCH software requires manual selection of data parsing fields instead of the use of a Parsing_Rules table by the loader application 60 as discussed hereinbefore.

The data loading operation discussed hereinbefore takes about an hour to electronically transfer data files from a number of remote sites. Manual data entry using printed data reports may take about a month to accomplish the same result. As noted hereinbefore, the complete electronic data transfer according to the present invention is not only efficient, but it also reduces errors typically occurring in manual data entry jobs.

Figure 16:
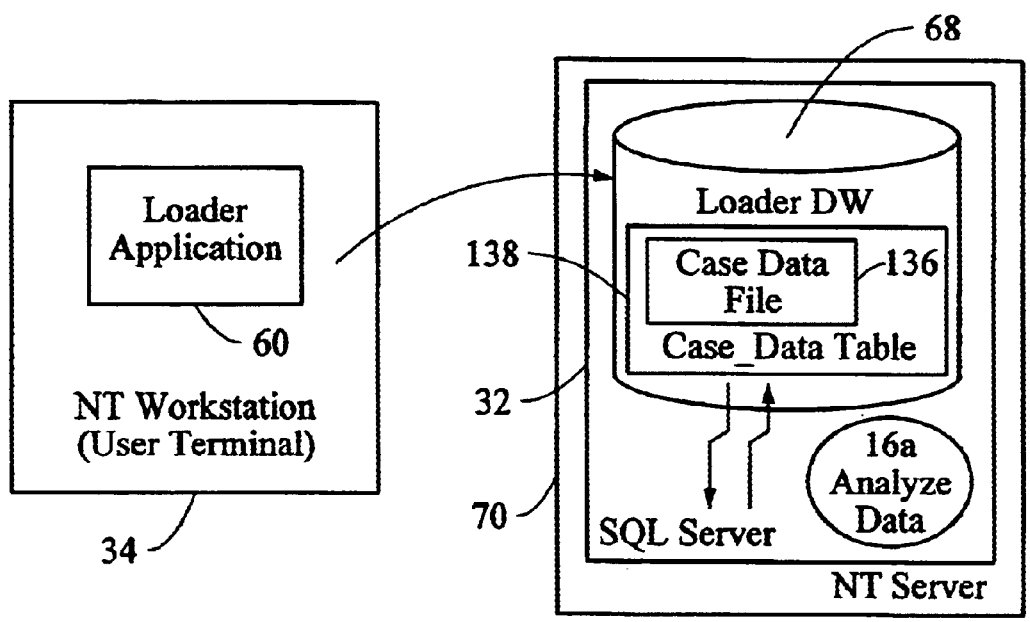
FIG. 16 depicts the data analysis phase of the loader application.

FIG. 16 depicts the Data Analysis phase (block 126, FIG. 10) of the loader application 60. In the Data Analysis phase at block 126 (FIG. 10), the loader application 60 loops through each entry or site in the Current_Day_Schedule view (table 134 in FIG. 12) that has the Analysis_Status equal to '-1' indicating that the data file from that site is "Ready to be Analyzed." The Data Analysis phase may perform the following tasks: (1) The Set-Status-To-Analyzing task; (2) The Analyze-Data-In-Database task; and (3) The Set-Final-Status task.

In the Set-Status-To-Analyzing task, the loader application 60 accesses the LoaderDW database 68 and updates the Analysis_Status field in the Current_Day_Schedule view (table 134 in FIG. 12) to the value of zero ('0') for the entry being processed. The '0' value in the Analysis_Status field indicates to the user that the data loaded from the corresponding site is currently being analyzed. A message text (e.g., "Analyzing") may be displayed for the corresponding site under the Analysis Report or Rpt Analysis column on the primary process form display 111 (FIG. 11). The Set-Status-To-Analyzing task may also update the Analysis_Start_Time field in the Current_Day_Schedule view (table 134 in FIG. 12) to contain the then-current system date/time.

In the Analyze-Data-In-Database task at step 16a, the loader application 60 may access the SQL server 32 and run an SQL server stored procedure appropriate for the data to be analyzed. In a database management system, a stored procedure is an operation that is stored within the database server (here, the SQL server 32). Typically, stored procedures may be written in SQL (Structured Query Language). A stored procedure is important for client-server database systems because storing a procedure on the server side means that it is available to all clients running on that server. Further, when the procedure is modified in the server, all clients connected to that server automatically get the new version of the procedure. A client may "call" the stored procedure to perform a desired function. Commercially available SQL database software, for example, the Microsoft Access or Sybase (from Sybase, Inc., of 6475 Christie Avenue, Emeryville, Calif., USA 94608), may also provide one or more stored procedures. The functions performed by stored procedures may include, for example, generating data tables in an SQL database, preparing Year-To-Date summary table for each file processed, performing user-specified (or predetermined) set of mathematical calculations on the data to be analyzed, etc.

The data to be analyzed may have been stored in a Data Table (here, the Case_Data table 138) in the LoaderDW database 68. A Data Table may allow a user to select whatever portion (or fields) of corresponding data file the user wants to analyze. The results of data analysis may be placed in one or more Analysis Tables in the LoaderDW database 68. The number of Analysis Tables in the LoaderDW database 68 may depend on, for example, the size and type of data. In one embodiment, the analysis results for the case data file 136 may be placed among a predetermined set of nine Analysis Tables, which are depicted in an exemplary set of Analysis Tables 175 in FIG. 22. In such an embodiment, the stored procedure for the Case_Data table 138 may execute nine insertion queries. Each query may analyze the data loaded earlier (in the Case_Data table 138) by the Data Load phase and insert the results into the appropriate one or more of the nine Analysis Tables.

The Set-Final-Status task may depend on the success of all of the above tasks performed during the Data Analysis phase. If the data (in the Case_Data table 138) are not analyzed successfully, the loader application 60 may update the Analysis_Status field in the Current_Day_Schedule view (table 134 in FIG. 12) to the value of '2' to indicate to the user or ASP 29 that an error has occurred during data analysis. The loader application 60 may display a message text (e.g., "Error Analyzing Data") for the corresponding site under the Rpt Analysis column on the primary process form display 111 (FIG. 11). However, if the data from a given site are analyzed successfully, the loader application 60 may update the following fields in the Current_Day_Schedule view (table 134 in FIG. 12): (1) The Analysis_Stop_Time field is updated to contain the then-current system date/time to indicate the time when the data analysis concluded; and (2) The Analysis_Status field is updated to contain the value '1' to indicate to the user or ASP 29 that corresponding data analysis was successful. A message text (e.g., "Successful Analysis") may also appear against the name of the corresponding site under the Rpt Analysis column on the primary process form display 111 (FIG. 41).

It is noted that instead of using the loader application 60 to analyze the case data loaded from the remote mainframe system 25, the ASP 29 may install a data reporting software (e.g., the Microsoft Access or the Microsoft Excel software) at the workstation 34 to store and analyze the case data. In other words, the ASP 29 may perform the data analysis operation without the help of the loader application 60.

As discussed hereinbefore with reference to FIG. 10, the Primary Process at block 117 initiates and manages performance of the Sleep Process (block 128) and the Termination Process (block 130). The Sleep Process is initiated at block 128 after conclusion of the Data Analysis Phase at block 126 (discussed hereinbefore). The Sleep Process determines whether or not all entries in the Current_Day_Schedule view (table 134, FIG. 12) were successfully processed. In one embodiment, upon finding that no entry or site in the Current_Day_Schedule view (table 134, FIG. 12) has the respective Verify_Status field equal to '−1' (i.e., "Ready to Verify" status), the Sleep Process may enter its "sleep" state for fifteen minutes. When the Sleep Process returns to its "awake" state after being in the "sleep" state for fifteen minutes, the Sleep Process may check the system time (as given by the system clock for the NT workstation 34) versus the shutdown time (as given by the ShutDown field in the initialization file 61 in FIG. 4) for the loader application 60. If the system time has exceeded the shutdown time, the Primary Process initiates the Termination Process at block 130 and concludes the Sleep Process. However, if the system time has not exceeded the shutdown time, the Primary Process may loop back and initiate the Main Process (block 120) for all entries in the Current_Day_Schedule view 134 (FIG. 12) having Verily_Status field containing a negative one ('−1') value indicating that the corresponding entry is "Ready to Verify Again." Further processing for that entry progresses as discussed hereinbefore with reference to blocks 120 128 in FIG. 10.

The Termination Process at block 130 (FIG. 10) shutdowns the loader application 60 and unloads the loader application 60 from the workstation's 34 volatile memory space (block 132). As mentioned hereinbefore, the Termination Process is initiated upon clicking of the 'Cancel' button 116 on the primary process form 111 (FIG. 11). Additionally, as discussed hereinbefore, the Termination Process may also be initiated when all entries have been successfully processed during the Main Process (block 120, FIG. 10), or when the system time (as given by the system clock for the NT workstation 34) exceeds the shutdown time (as given by the ShutDown field in the initialization file 61 in FIG. 4) for the loader application 60.

The Performance Tracking Process mentioned hereinbefore is a by-product of the Primary Process. As part of the Performance Tracking Process, the loader application 60 supplies record date and time stamps relative to each phase and/or task within the Primary Process. The date and time stamping facilitates maintenance and archival of all daily records for a defined period of time, thereby allowing audit reporting, bench marking, and sampling of the archived case data.

Figure 17:
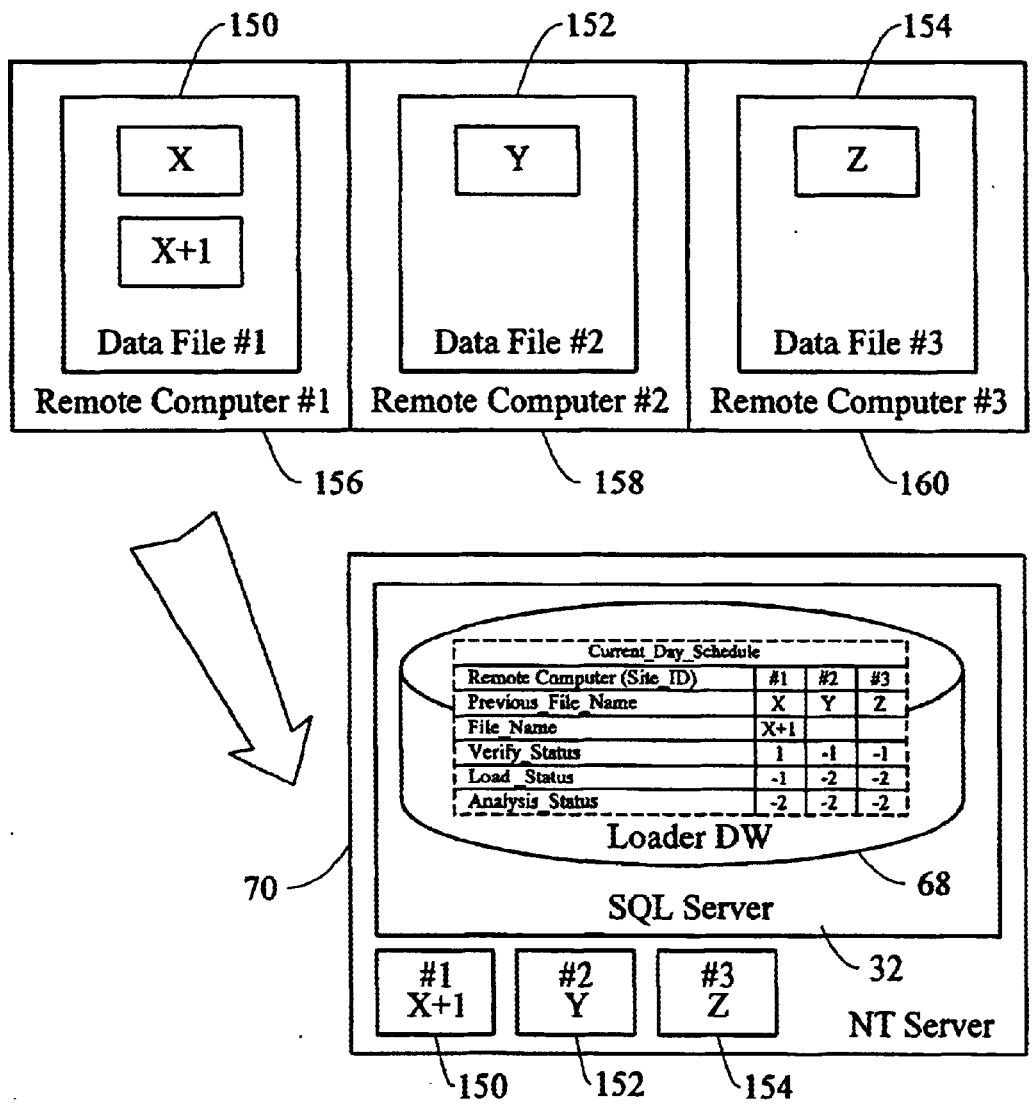
FIGS. 17–19 display some exemplary stages in a data loading process where data files from different mainframe systems are to be loaded into the SQL server database by the loader application.
Figure 18:
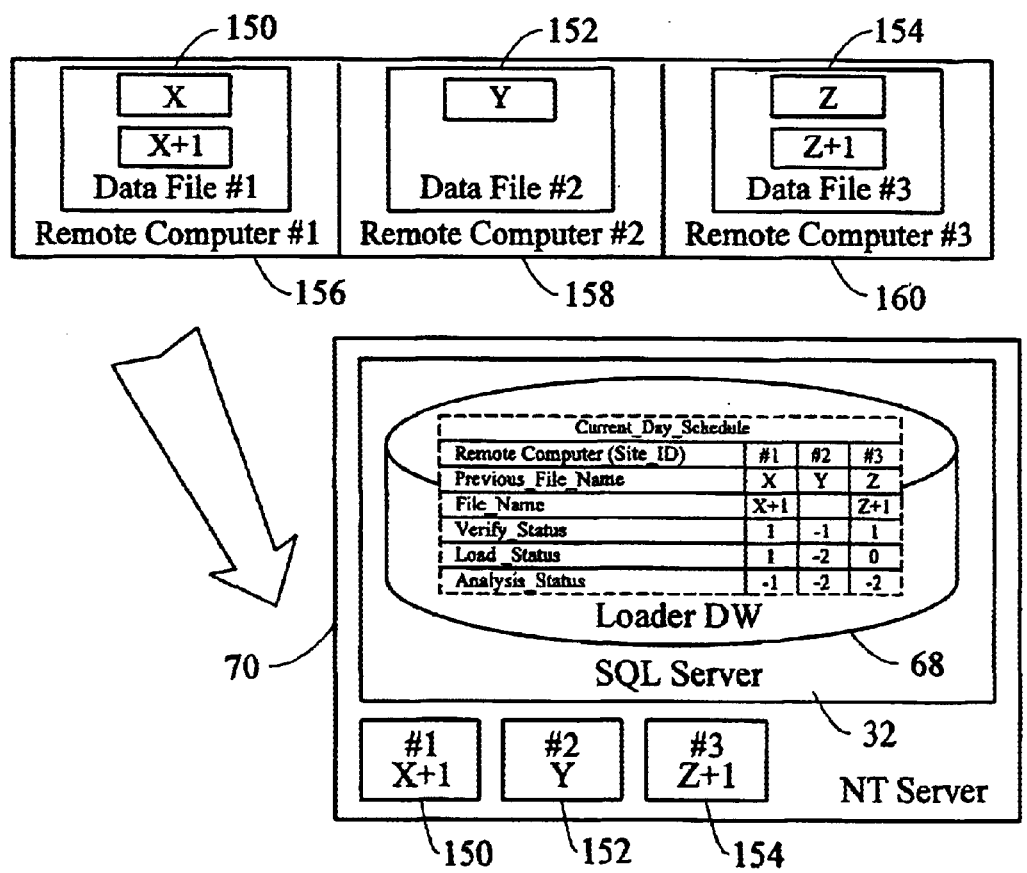
Figure 19:
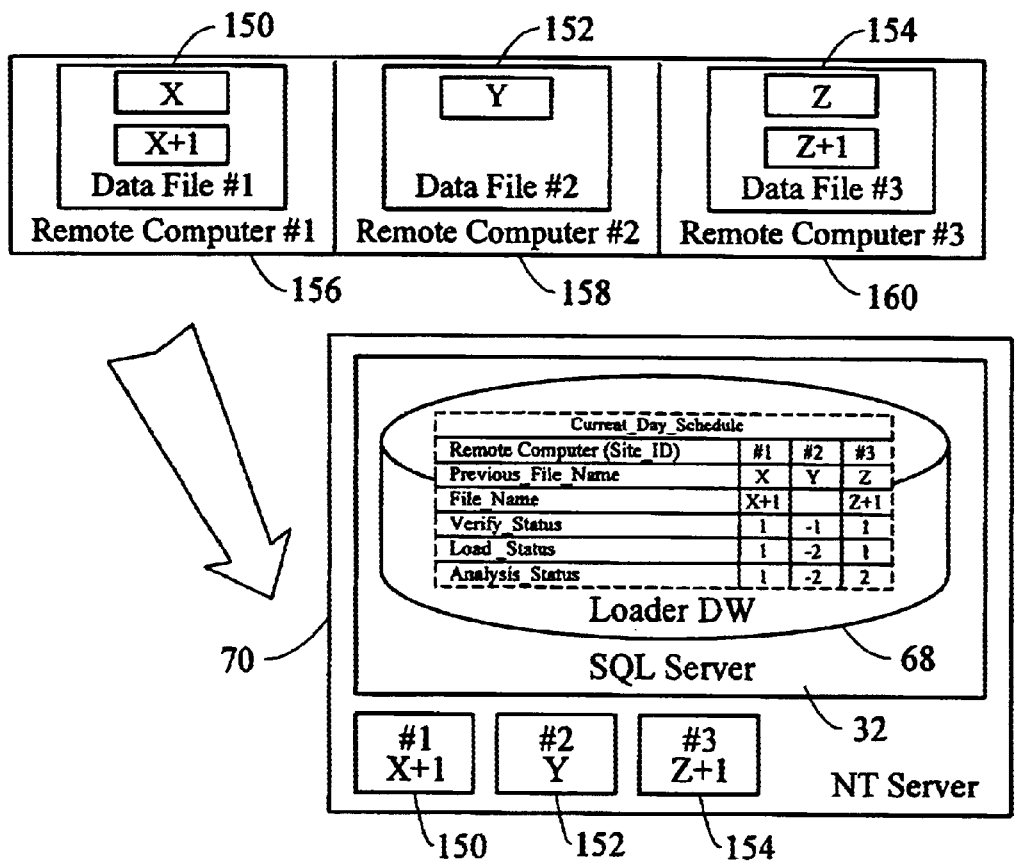

FIGS. 17–19 display some exemplary stages in a data loading process where data files (150, 152, and 154) from different mainframe systems (156, 158, and 160 respectively) are to be loaded into the SQL server database (i.e., the LoaderDW database 68) by the loader application. The discussion given hereinbefore generally focused on the loading of one case data file (e.g., the case data file 136 in FIG. 13) from a remote mainframe system (e.g., the mainframe system 25). However, FIGS. 17–19 depict an automated data loading process where more than one case data file is loaded from respective remote mainframe systems using the loader application 60. As discussed hereinbefore, there may be more than one mainframe system in a TSP's telephone network, and the case data from each of these mainframe systems may need to be processed by the central processing facility. In FIG. 17, each remote mainframe system 156, 158, and 160, is shown to have stored therein a case data file for further processing by the central NT server 70.

Initially, the Verify_Status field (in the Current_Day_Schedule view 134 in FIG. 12) for the most recent case data file to be processed contains a "−1" value. In the arrangement illustrated in FIG. 17, the remote computer site #1 (156) has generated the most recent file X+1 that is to be processed (i.e., to be loaded and analyzed) by the loader application 60. As discussed hereinbefore, the loader application 60 first verifies the processing status of the X+1 file and, upon successful verification, changes the Verify_Status field to "1" (as illustrated in FIG. 17). Thereafter, the loader application initiates a file verification operation for the remote computer site #2 (158) because of the "−1" value in the Verify_Status field for the Site_ID #2 (i.e., the remote computer system 158) in the Current_Day_Schedule view shown in FIG. 17. However, because there is no most-recent file to be verified for the remote site 158 (as indicated by the empty Current_Filename field for site #2 in the Current_Day_Schedule view), the loader application 60 next attempts to initiate file verification operation for the remote site #3. As shown in FIG. 17, the Verify_Status field for the Site_ID #3 (i.e., the remote computer system 160) contains the "−1" value, indicating the ready-to-be-verified status for the case data file given by the Current_Filename field for Site_ID #3. In short, the loader application 60 first sequentially verifies the appropriate case data file at a remote site starting with the remote site #1. Thereafter, the loader application 60 sequentially performs data loading operations for the files verified, and then sequentially analyzes the loaded case data files as discussed hereinbelow.

In FIG. 17, only the remote computer site #1 (156) has generated the most-recent case data file that needs to be verified, loaded, and analyzed. The remaining two sites 158, and 160, do not have the most-recent case data files as yet (i.e., at the time when the loader application 60 initiates its data loading process starting with the remote site 156). The data files retrieved from the corresponding remote sites and stored in the NT server 70 are also shown in FIG. 17. Thus, in the case data file retrieval scenario depicted in FIG. 17, the NT server 70 contains the following: (1) The most-recently retrieved case data file from the remote site 156 (i.e., the data file X+1); (2) The previously-retrieved and loaded (e.g., during the previous iteration of the loader application 60 or during the data loading operation performed the night before) case data file from the remote site 158 (i.e., the data file Y); and (3) The previously-retrieved and loaded case data file from the remote site 160 (i.e., the data file Z).

As noted hereinbefore, in one embodiment, the case data files retrieved from remote mainframe systems may get deleted from the NT server's memory once the data from these case data files are successfully loaded in the LoaderDW database 68. In such an embodiment, the case data files 150, 152, and 154, may not be physically present in the NT server 70's memory as shown in FIG. 17. Thus, in general, FIG. 17's representation of case data files in the NT server 70 should preferably be construed as part of an illustration of multiple-file data loading operation in conjunction with FIGS. 18–19, rather than a representation of the actual physical content of the NT server 70's memory. Furthermore, for the sake of convenience and ease of explanation, the same numerals are used to represent the data files in the remote computers 156, 158, 160, and in the NT server 70. For example, the case data file 150 in the remote mainframe system #1 (156) may contain two versions of case data—the most-recent version X+1, and the next most-recent version X. However, for the sake of illustration, the same numeral 150 is used to refer to both of them as illustrated in FIGS. 17–19. The same reasoning applies to other data files in other remote computer sites also.

Upon completion of the file verification operation for each remote site, the loader application 60 begins the data loading process in sequence, i.e., starting with the X+1 file 150 from the first remote computer system 156 because the Load_Status field for that file contains a "−1" (i.e., "ready to load") value. Referring now to FIG. 18, it is noted that the Load_Status field for the data file X+1 in the remote computer site #1 (156) contains the value "1" indicating that the loader application 60 has completed loading the data file X+1 in the NT server 70's memory. Upon successful loading of the case data file X+1, the loader application 60 changes the value in the corresponding Analysis_Status field from "−2" (as shown in FIG. 17) to "−1" (as shown in FIG. 18), indicating that the X+1 case data file 150 is now ready to be analyzed. The loader application 60 then progresses to process the most-recent (and unprocessed) case data file from the next remote computer site (i.e., the site #2). However, because there is no currently available file (as indicated by absence of any entry under the Current_Filename field for site #2) that can be verified and loaded from site #2, the loader application progresses to process case data from the next remote site, i.e., the remote site #3. At this time, the remote site #3 has generated a case data file Z+1 that is ready to be loaded. However, prior to beginning the data loading operation from the remote site #3, the loader application 60 first verifies the processing status of the Z+1 file and, upon successful verification, changes the Verify_Status field from "−1" (as shown in FIG. 17) to "1" (as shown in FIG. 18). Upon completion of the verification phase, the Load_Status field is changed from "−2" (as in FIG. 17) to "−1" (not shown) prior to the commencement of data loading operation. Thereafter, the loader application starts the data loading operation for the Z+1 file and changes the value for the Load_Status field from "−1" to "0" as shown in FIG. 18. As mentioned hereinbefore, the depiction (in FIG. 18) of the Z+1 file 154 as being part of the NT server 70's memory is for illustrative purpose only. The complete Z+1 data file 154 may not exist in the NT server 70's memory until the data loading operation is successful as discussed hereinbelow with reference to FIG. 19.

Turning now to FIG. 19, it is noted that the loader application 60 has successfully completed the loading of the case data file Z+1 (as indicated by the value "1" in the Load_Status field for remote site #3). The loader application changes the value for the Analysis_Status field (for site #3) from "−2" to "−1" (not shown in FIG. 18). The loader application 60 is now ready to sequentially analyze each loaded file, starting with the file for the remote site #1 (i.e., the case data file X+1) and ending with the file for the remote site #3 (i.e., the case data file Z+1). As shown in FIG. 19, the data analysis phase for the case data file X+1 concludes successfully and, hence, the loader application 60 changes the value for the Analysis_Status field (for site #1) from "−1" to "1". Thereafter, the loader application 60 takes on the file processing task for the most recently created file at the remote computer site #2. In the absence of any newly-created case data file from site #2, the loader application takes on file processing for the remote computer site #3. The loader application now attempts to perform the data analysis task for the most recently loaded case data file Z+1. However, as shown in FIG. 19, the analysis task is not completed successfully (as indicated by the value "2" for the Analysis_Status field for site #3).

There may be a number of reasons why the loader application could not successfully complete the case data analysis. For example, the SQL server database (here, the LoaderDW database 68) may not have sufficient memory space to store the analyzed data, In the case of the SQL server 6.0, manual intervention from the operator or ASP 29 at the NT workstation 34 may be required to cure the memory storage problem. In one embodiment, an SQL server 7.0 may be used. The SQL server 7.0 is capable of expanding database capacity automatically (i.e., without operator's or user's manual intervention) as and when needed by an application (here, the loader application 60). The case data analysis may also get interrupted when the network connection is lost between the NT workstation 34 and the NT server 70. When a remote mainframe computer system malfunctions or does not allow remote access from the NT workstation 34, even the data loading operation may not get performed. In such situations, the user or ASP 29 may receive a visual text message on the display screen (not shown) of the NT workstation 34 informing the user that an error has occurred and the corresponding operation has not been successfully completed.

In short, the loader application 60 sequentially and iteratively performs case data file verification, loading, and analysis operations for each most-recently created case data file at various remote mainframe systems within the TSP's network until all the case data files are processed as scheduled. The following steps may generally outline what the loader application does in the event of case data transfers from multiple remote sites. (1) The loader application looks for the first case data file ready to be processed (e.g., file X+1). (2) The loader application then updates the appropriate status field to "0" indicating that the corresponding processing (e.g., file verification, file loading, etc.) is "in progress." This may be desirable when there are multiple ASP's 29 or operators in the TSP's central data processing facility. Each ASP 29 may be assigned an individual NT workstation 34 running its own copy of the loader application 60. Therefore, to prevent conflicts or clashes between two or more loader applications, it is desirable that each loader application set the status fields appropriately so as to prevent other loader applications from performing the same function or from processing the same case data files. (3) Thereafter, the loader application performs the desired operation (e.g., data loading, data analysis, etc.). (4) If the task/operation is successful, the loader application updates the corresponding status field accordingly (i.e., with the value "1" for the field). (5) If the task/operation is normal unsuccessful, the loader application updates the corresponding status field to "−1", indicating the "ready again" status for the task. The loader application may then take up the pending execution of this task in the next iteration of the loader application. (6) If the task/operation is not normal unsuccessful, the loader application updates the corresponding status field to "2" (e.g., the Analysis_Status field for site #3 in FIG. 19) to indicate an error condition, as discussed with reference to FIG. 19. All of the foregoing steps are performed for each remote mainframe computer site until all case data files from remote sites are successfully processed (i.e., verified, loaded, and analyzed), unless the loader application encounters any error conditions.

Figure 20:
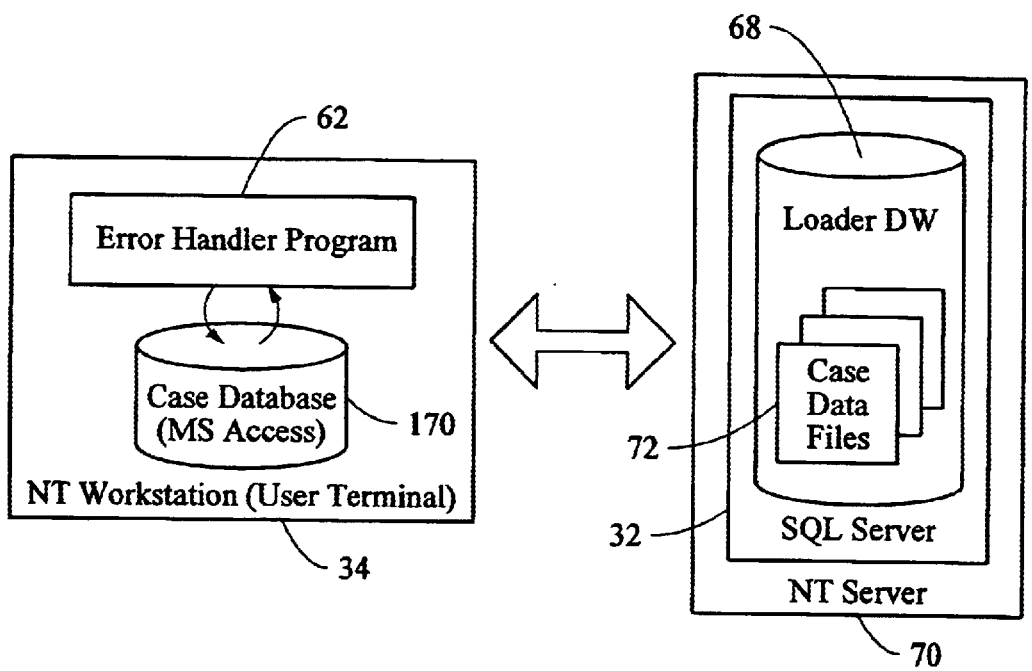
FIG. 20 depicts an arrangement whereby case data errors are investigated and disposed of in an appropriate manner using the error handler program.

FIG. 20 depicts an arrangement whereby case data errors are investigated and disposed of in an appropriate manner using the error handler program (EHP) 62. The EHP 62 may be an executable Microsoft Visual Basic® file with manual or automatic startup capability. As noted hereinbefore, the case data files 72 retrieved (by the loader application 60) from various remote mainframe computer sites are loaded in the Loader DW database 68 in one or more Data Tables. FIG. 21 shows an exemplary Data Table 138 in the LoaderDW database 68. The Case_Data table 138 in FIG. 21 may be pre-selected during the database design phase so that all case data retrieved from remote sites are loaded (i.e., organized) into appropriate fields in the Case_Data table 138. Some exemplary fields in the Case_Data table 138 include the Site_ID field, the Case_ID field, the Create_Date field (i.e., when the particular case entry was created in the Case_Data table), the Carrier_Code field (needed when there is more than one telephone carrier involved in completing the telephone call at issue), the Last_Presented field (indicating when an unresolved case data entry was last reviewed),etc. Further discussion of some data fields is given hereinbelow in conjunction with the discussion for FIGS. 20 and 22. Suffice it to note that the case data from remote mainframe sites are organized in such data fields prior to case data analysis and error handling operations.

As noted hereinbefore, the loader application 60 analyzes the case data from different case data files 72 and stores the data analysis results (for each remote site) into a number of Analysis Tables in the LoaderDW database 68. FIG. 22 illustrates an exemplary set of Analysis Tables 175 in the LoaderDW database 68. In the embodiment illustrated in FIG. 22, there are nine Analysis Tables—namely, the Site Information table, the User IDs table, the Case Status table, the Case Disposal table, the Work Types table, the Carrier Codes table, the Daily Schedule table, the Hold Indicator table, and the Error Codes table. In alternative embodiments, the database designer may implement more or less Analysis Tables than those illustrated in FIG. 22. Different fields constituting each Analysis Table are also illustrated in FIG. 22. The loader application 60 thus analyzes data from the Case_Data table 138 and places analysis results into appropriate fields in one or more Analysis Table(s) 175 for further processing by other software applications, e.g., the error handler program 62 described hereinbelow.

A few of the fields depicted as part of one or more Analysis Tables 175 are now described. The Case_Status_Flag field may contain a pre-determined numeric or alphanumeric value that indicates to the operator or ASP 29 processing the corresponding case using the EHP 62 (discussed in more detail hereinbelow) how to resolve the case in the event that the case follows a certain set of rules. For example, the TSP may decide, as a rule, that if a case data entry remains unresolved for more than 30 days, the ASP 29 may remove that entry from the corresponding case data file and mark it "resolved" or may send the unresolved matter for further action, e.g., to a money collection agency. The Satus_Description field in the Case Status table may contain a brief description of what the numerical entry in the Case_Status_Flag field means. In one embodiment, the Case_Status_Flag may contain numeric values "0", "1", "−1", etc., similar to the set of numeric values described hereinbefore with reference to, for example, Verify_Status, Load_Status, and Analysis_Status fields in FIGS. 17–19. The Carrier_Code field identifies which telephone carriers (e.g., AT&T, MCI, SPRINT, etc.) have been used to carry out the telephone communication associated with an error message or case entry. The Work_Type field may contain a pre-determined numeric or alphanumeric value assigned for a set of error messages that follow the same rules of investigation. The Work Types table may keep only one record per work type so as to save memory space and also to expedite error handling. For example, disposal of the record in the Work Types table in one way may result in disposal of similar error message in the same way. The Hold Indicator table may indicate what is the current status of a case. Here, the Hold_Indicator field may contain numeric, alphanumeric, or text messages identifying the status of the case currently being processed. For example, the Hold_Indicator field may indicate to a user or ASP 29 that the case the user or the ASP 29 is investigating is "on hold" (i.e., investigation is pending, and not complete yet), or "to be unbilled" (i.e., the customer(s) may get money credit for the error message(s)), or "to be released or redirected" (i.e., the case is still not completely resolved, more explanation from the customer(s) may be requested). In one embodiment, the default value for the Hold_Indicator field may be the "Unassigned" value. The user or ASP 29 may later change this value to one of the other values when case data are further processed (e.g., with the help of the EHP 62).

Some exemplary relationships between two Analysis Tables from the set of Analysis Tables 175 illustrated in FIG. 22 are: (1) There is a one-to-one relationship between the Work Types table and each of the following tables: the Site Information table, the User IDs table, and the Case Status table. The one-to-one relationship is desirable so as to prevent one operator/user from updating records being processed/handled by another operator/user; (2) There is a one-to-many relationship between the Work Types table and each of the following tables: the Daily Schedule table, the Carrier Codes table, the Error Codes table, the Hold Indicator table, and the Case Disposal table; and (3) There is a one-to-many relationship between the Daily Schedule table and the Site Information table because for every work type (as given by the value in the Work Type field) there are N number of views in the Daily Schedule table (as described hereinbelow), where N equals the total number of remote mainframe computer sites in the TSP's telephone network. In other words, the operator or ASP 29 investigating error messages may handle similar errors (i.e., errors falling under a common Work_Type field) from different remote sites together.

The error handler program (EHP) 62 resides in the NT workstation's memory and operates on the case data previously analyzed by the loader application 60. In the embodiment illustrated in FIG. 20, the EHP 62 retrieves data from the Case_Data table 138 in the LoaderDW database 68 and first stores the retrieved data in the NT workstation's 34 memory. Later, the EHP 62 stores a portion of the retrieved data entries in a case database locally created in the NT workstation 34. The EHP 62 also retrieves the results from the Analysis Tables 175 in the LoaderDW database 68. The EHP 62 then operates on the locally-stored data under instructions from the user or ASP 29, who may dispose of various error messages based on the information contained in one or more Analysis Tables 175. Thereafter, the EHP 62 updates the status of case data in the SQL server 32. The update action thus informs another operator or ASP 29 what is the current processing status of the pending case data and how to properly continue further processing in future, if needed. In one embodiment, each NT workstation 34 in the central processing facility may contain a copy of the EHP 62 so as to allow parallel processing of a large number of case data files by different operators or ASPs 29, without duplicating one another's work. The case database may be locally created using the Microsoft Access software.

The creation of a local database may help reduce the network data traffic between an NT workstation 34 and the NT server 70. It is noted that, typically, each access to the SQL server 32 may result in transmission of two distinct messages in the network—the first message is sent to identify whether the destination computer (e.g., the NT workstation 34) exists so as to establish a communication link between the SQL server 32 and the workstation 34; and the second message is sent (from the SQL server 32 or the workstation 34, as appropriate) to transmit appropriate data to the destination computer. The network traffic is reduced because: (1) All to-be-processed case data files are downloaded at the same time in the memory of an NT workstation or local terminal; and (2) The operator or ASP 29 for the NT workstation 34 may locally update/process the data and finally send all the processed data back to the SQL server 32 (i.e., to the Loader DW database 68). Such an arrangement is more efficient and less time consuming in place of downloading one file from the SQL server 32, processing that file, sending the processed file back to the SQL server 32, and repeating all of these steps on a file-by-file basis for each unprocessed file.

Prior to the creation of the case database 170 (FIG. 20), the EHP 62 may generate a Current Daily Schedule view (not shown) on the display screen of the NT workstation 34 from the analysis results received as part of the Daily_Schedule table. Here, the Current_Daily_Schedule view may contain N entries (or views)—one for each of the N remote mainframe computer sites in the TSP's network. In one embodiment, there may be twelve remote mainframe sites, thereby generating twelve entries in the Current_Daily_Schedule view. The Current_Daily_Schedule view (for the Daily Schedule table) is primarily based on error codes, and may be generated in a manner similar to that described hereinbefore for the Current_Day_Schedule view in FIG. 12 (for the Download_Schedule table). The ASP 29 may manually specify the Work_Type the ASP wants to investigate presently, and, based on the Work_Type selected, the EHP 62 may automatically display the Current_Daily_Schedule view. The following pseudo code may be executed to generate the Current_Daily_Schedule view for a given date (specified by the ASP) for N remote mainframe sites:

```
SELECT * [i.e., all entries] from the Daily Schedule table
    where Create_Date = Get Date () [user-specified date]
```

For a selected Work_Type, the EHP 62 may generate N entries within the Current_Daily Schedule view—one for each of the N remote mainframe computer sites. The user or ASP 29 may select the content for each of the N entries (i.e., which error messages need to be displayed in the Current_Daily_Schedule view for N remote mainframe sites) based on one or more selection criteria. In one embodiment, the ASP 29 may prescribe an Error_Code for the selected Work_Type and may also prescribe desired values for other fields in the Case_Data table 138 so as to instruct the EHP 62 as to what type of error messages or error message data (from the downloaded Case_Data table) should be displayed for each remote site in the Current_Daily_Schedule view. Thus, each of the N views (or entries) states an intelligent query of Case_Data table that references the error codes to the values in the Error Codes table (FIG. 22). The EHP 62 may execute the following pseudo code to automatically generate the user requested content for the Current_Daily_Schedule view.

```
SELECT * from Case_Data table
    where Error_Code = () [user-specified value]
    AND Carrier_Code =
    AND Messages =
    AND Revenue =
    AND Site_ID =
    AND Hold_Indicator =
    AND Case_Status_Flag =
    AND Work_Category =
```

The ASP 29 may input certain values for the fields given above. For example, the ASP 29 may specify the minimum and maximum limits for the Messages field that the ASP 29 wants to handle in a given data processing session. Similarly, the ASP 29 may also input a certain dollar amount for the Revenue field. For example, the ASP 29 may instruct the EHP 62 to retrieve only those error messages that have a disputed dollar amount greater than $10. Alternatively, the ASP 29 may instruct the EHP 62 to retrieve only those error messages that have less than ten dollars in dispute, so as to either efficiently discard those cases or to further investigate the problem if the frequency of error is greater than a certain threshold for a given customer. For the Site_ID field, the ASP 29 may specify one site at a time to cover all of the N sites. The Case_Status_Flag for a case may be selected as "−1" indicating that the case is ready for further investigation, and, possible disposal. It is noted that the ASP 29 may change another set of selection criteria, and the EHP 62 may obtain another set of error messages in response thereto. It is also observed that some of the error messages may have more than one Case_ID value assigned thereto and, hence, such error messages may get selected again even if the ASP 29 changes certain selection criteria.

If the Current_Daily_Schedule view is empty (on a given NT workstation), then the EHP 62 may perform the following Lead Process (similar to the one described hereinbefore with reference to the Current_Day_Schedule view for the loader application 60). It is noted that typically only one or two user terminals (i.e., NT workstations 34) in the TSP's central processing may encounter empty Current_Daily_Schedule views. In such a case, the EHP 62 may immediately create the proper Current_Daily_Schedule view with the Lead Process described hereinbelow. The pseudo code for this Lead Process may be:

```
IF Current_Daily_Schedule is empty, THEN
(1) INSERT into Daily_Schedule
      from UNION of Work Types table and Site Information table
      [to bring all the records for a given Work_Type and a given
      Site_ID, i.e., record per Work_Type per Site_ID]
(2) UPDATE Current_Daily_Schedule view
      SET Target Cases = SELECT Count (*) from Site_## [i.e., Site-1,
      Site-2, Site-3,..., Site-N] for each Work_Type
      [determines how many cases the ASP 29 is going to investigate
      today]
(3) UPDATE Current_Daily_Schedule view
      SET Case_Status_Flag = (−1) where Target Cases >0
      [if no cases to investigate (i.e., Target Cases = 0), then Lead Process
      will not modify the Case_Status_Flag and will leave it unchanged
      from its previous value]
END IF
BEGIN PROCESS
```

After the Lead Process (if needed), the EHP 62 may execute the following steps as part of handling and investigating error messages under user (i.e., ASP 29) control. It is noted that the following steps performed by the EHP 62 may be similar in nature to those performed by the loader application 60 discussed hereinabove. The steps executed by the EHP 62 (with minimal user input) are:

(1) READ Current_Daily_Schedule for any record that is ready to be processed (i.e., having a "−1" value for the Case_Status_Flag). This operation may get the first set of error messages to be processed for a user-selected Work_Type and Site_ID.

(2) UPDATE Case_Status_Flag to the value "0" to indicate (e.g., to other users or ASPs) that the corresponding case record is "currently being processed."

(3) CREATE an MS Access database (i.e., the case database 170 in FIG. 20) on the local workstation that is being operated by the ASP 29. Initially, the database 170 may be empty. The EHP 62 may then store the appropriate portion of the case data content (retrieved from the LoaderDW database 68) into the case database 170 as mentioned in step (4) below. In one embodiment, each NT workstation in the TSP's central processing facility may have its individual local MS Access database created therein. In an alternative embodiment, the MS Access database 170 may be created on a central server, with each workstation accessing the central server and sharing the database with other workstations in the processing facility. However, such a database-sharing arrangement may not be efficient.

(4) SELECT into the MS Access database 170 case data (or error messages) from a user-selected Site_## (i.e., Site-1, Site-2, . . . , or Site-N) for a user-selected Work_Type. This step results first in creation of a local table within the MS Access database 170 and then insertion therein of case data with user-selected parameters. Because of the local nature of data processing in steps (3) and (4), the network traffic between each NT workstation 34 and the NT server 70 is reduced. It is noted that all the field names (in a local table) may get created fresh every time a new local table is generated here.

(5) READ local case table (created in step(4) above) for the first record from a user-selected site that is ready to be processed (i.e., the record having Case_Status_Flag=(−1)). For a user-selected site, this step gets and displays each record belonging to the common, user-selected Work_Type.

(6) PERFORM necessary mainframe lookups according to the work type rules and return investigative status. For some error messages, it may become necessary for the ASP 29 at the NT workstation 34 to access the remote mainframe system for the corresponding site to check, for example, the history of the error messages at issue, or the resolution status of the messages (e.g., customer got credit, or customer paid the amount owed, etc.). In such an event, the EHP 62, with the help of the emulator module 64 (FIG. 4), may automatically access appropriate systems (e.g., the CLUE system, the BOCRIS database, etc.) at the corresponding remote mainframe site.

(7) DISPOSE of qualifying cases according to values stored in the Case_Disposal table (FIG. 22) for the user-selected Work_Type. Here, the user or the ASP 29 may manually view appropriate case entry on the workstation display terminal (not shown) and instruct the EHP 62 to perform user-selected case resolution (e.g., give credit to the customer, bill the customer, review the case further, etc.) for the case entry at issue.

(8) UPDATE the Case_Status_Flag value in the local table created at step (4) above. The value of the Case_Status_Flag (e.g., "1" for "successful", or "2" for "successful") may be determined based on the how the ASP 29 decided to resolve the case at step (7) above. It is noted that steps (5) through (8) are performed for all records in the local table created at step (4) above.

(9) PERFORM Update Query back to the SQL server 32 for all case status in the local table. Here, the EHP 62 updates the case status for all the records under a given Work_Type for the user-selected site by executing Update Queries (for the status data in the NT workstation 34) to the SQL server 32 (i.e., to the LoaderDW database 68).

(10) PERFORM Update Query on the Daily Schedule table (in the LoaderDW database 68), and set the value for the Status_Flag=1. Also, ENTER the actual numbers for the Disposed Cases (including, for example, cases that the ASP 29 decides to unbill) and Handled Cases (e.g., cases put on hold, or cases redirected for further review) fields in the Daily Schedule table (FIG. 22). It is noted that steps (9) and (10) are common for all case records under a given Work_Type value. The common processing of status results may reduce the network traffic. In one embodiment, the EHP 62 may also access (with the help of the emulator module 64) appropriate mainframe systems (e.g., the CLUE system, the BOCRIS database, etc.) and enter appropriate resolution status (e.g., "case resolved", "credit given to customer", "case still pending", "case under further investigation", etc.) against corresponding cases stored therein so as to assist future investigators about the disposition status of a case.

(11) DELETE the local MS Access database 170 created in the NT workstation 34.

(12) REPEAT steps (1) through (11), if the user selects another site for case data investigation.

The EHP 62 places pertinent information and data (e.g., number of messages allowed, revenue collected, revenue allowed, etc.) in appropriate tables generated locally at user terminals and references those tables. Thus, there is no need to create an executable file containing such information and data, and then send the file from corresponding NT workstation 34 to the NT server 70 for further processing. The use of the EHP 62 thus reduces the load on the workstation and the network traffic as mentioned earlier. Additionally, with the help of the EHP 62, the user or the ASP 29 may be able to track the response time for a remote mainframe system (e.g., the system 25 in FIG. 1). Here, the EHP 62 may instruct the emulator 64 (FIG. 4) to send a test query to a database in the remote mainframe system and compute the time it takes to receive a response from the remote mainframe system. In one embodiment, the EHP 62 may be used to generate printouts for telephone message audits and also for error message investigation process review so that the person managing the TSP's central processing facility may review performance of various operators handling case data investigations. The EHP 62 may provide a menu of items on the display screen for the user terminal 34 that a user can select to instantly audit case reports, including case disposition records (i.e., whether a case is billed, disposed of, etc.) for each selected Case_ID.

In the event that there are a large number of cases from a single site, it may take a very long time for the user to process/investigate those cases. In such a situation, case data from other remaining sites may not get processed in a timely manner. To prevent such non-uniform processing, the EHP 62 may be designed to process case records (for a user-selected Work_Type) from the first site for a predetermined duration (e.g., 1.5 hours), which can be programmable by the user. After that time, the EHP 62 may conclude further processing for the first site and may start data processing for the next available Work_Type at the next site. After the predetermined time has elapsed for the next site, the EHP 62 may start data processing for still another site. This sequence may continue until all the sites are covered. Thereafter, the EHP 62 may take on data processing for the first site and continue processing one site after another, again restricting the duration of data processing to the predetermined limit. This time-sharing or time-slicing approach may be repeated so long as there remains some time to process case data from a site during the current processing session.

Furthermore, the EHP 62 may generate a performance report for the TSP's information technology (IT) department to review. Here, the performance report may specify various response times (e.g., how fast one computer responds when a key is pressed at another computer connected thereto) within the TSP's billing network (e.g., the network connecting the NT workstation 34 and the NT server 70), the delivery status of various case data files, the time of the day (e.g., AM or PM) when the case data investigations were carried out, etc. Such ancillary information collected by the EHP 62 (with the help of the emulator 64) may assist the IT department personnel in designing and maintaining an optimum computer network for the organization.

The foregoing describes systems and methods for electronically handling a large amount of data (e.g., case data) generated within, for example, a telephone service provider's billing network. A configuration utility software may electronically change configuration data for another software application, e.g., a loader application. The configuration utility thus allows a user to electronically change or update various configuration parameters for the loader application, and also to access the performance data generated by the loader application so as to optimize the performance of the loader application in varying data transfer situations. The loader application, in turn, is a computer-based data transfer application that electronically loads a large volume of data, e.g., telecommunication billing data, from one computer into another computer. The loader application thus substantially reduces human involvement during transfers of large amount of data, and thereby also reduces errors typically associated with manual data entries by human data operators. After completion of data transfers, an error handler program facilitates electronic investigation and disposal of errors in the received data, thereby minimizing participation of human operators in the data error rectification process. The reduced reliance on manual identification and correction of data errors thus results in increased accuracy and efficiency in the overall network data management and customer billing operations.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method of changing values of one or more configuration parameters in a configuration file for a software application residing on a first computer, said method comprising:

displaying an interactive form on a display screen for said first computer, wherein the interactive form lists each of said one or more configuration parameters along with a corresponding current value associated therewith;

receiving a first input from a user of said first computer, wherein the first input from the user provides one or more replacement values that replace corresponding one or more current values as displayed on the interactive form;

receiving a second input from the user;

accessing the configuration file for said software application in response to the second input from the user; and electronically replacing said one or more current values in said configuration file with said one or more replacement values corresponding thereto.

2. The method as in claim 1, further comprising saving the configuration file with said one or more replacement values inside said first computer.

3. The method as in claim 1, further comprising:

receiving a third input from the user prior to the second input, wherein the third input includes one or more data entries to be stored in a database in a second computer;

accessing the database in the second computer in response to the second input from the user; and electronically storing said one or more data entries in the database.

4. The method as in claim 3, wherein accessing the database includes accessing a table stored in said database and electronically storing said one or more data entries in the database includes electronically storing said one or more data entries in the table in the database, wherein the table is configured to contain location information for one or more data files handled by the software application.

5. The method as in claim 1, wherein accessing the configuration file for said software application includes sending API (Application Program Interface) calls to the configuration file.

6. A method of reviewing process status values for a software application residing on a first computer, said method comprising:

displaying a first interactive form on a display screen for said first computer, wherein the first interactive form allows a user of said first computer to select a date for which the user wishes to review the process status values for the software application;

receiving a first input from the user, wherein the first input from the user specifies the date that the user wishes to review the process status values for;

receiving a second input from the user; and displaying a second interactive form on the display screen in response to the second input from the user, wherein the second interactive form contains the process status values for the software application for the date selected by the user.

7. The method as in claim 6, wherein displaying the second interactive form includes:

electronically accessing a database in response to the second input from the user, wherein the database is configured to contain respective process status values for the software application for a plurality of dates;

electronically retrieving the process status values for the user-selected date from the database; and displaying the retrieved process status values on the second interactive form.

8. The method as in claim 7, wherein electronically accessing the database includes:

establishing a communication link between the first computer and a second computer, wherein the second computer contains said database; and communicating with the second computer via the communication link to access the content of the database.

9. The method as in claim 7, wherein electronically accessing the database includes:

creating a connection object;

supplying to the connection object a first set of access information, wherein the first set of access information allows the connection object to establish a communication link between the first computer and a second computer, and wherein the second computer contains said database;

creating a database object; and supplying the database object with a second set of access information, wherein the second set of access information allows the database object to access said database in the second computer.

10. The method as in claim 9, wherein electronically retrieving the process status values includes executing one or more update queries from the database object to the database in the second computer.

11. A configuration utility software for changing values of one or more configuration parameters in a configuration file for a computer program residing on a computer system, wherein the configuration utility software, when executed by said computer system, causes the computer system to:

display a first interactive form on a monitor screen for said computer system, wherein the first interactive form lists said one or more configuration parameters for said computer program along with corresponding current values for said one or more configuration parameters;

receive a first input from a user of the computer system, wherein the first input from the user provides one or more replacement values that replace corresponding one or more current values as displayed on the first interactive form;

receive a second input from the user;

access said configuration file for said computer program in response to the second input from the user; and replace said one or more current values in said configuration file with said one or more replacement values corresponding thereto.

12. The configuration utility software as in claim 11, wherein the configuration utility software, upon execution, further causes the computer system to:

display a second interactive form on the monitor screen, wherein the second interactive form allows the user of said computer system to select a date for which the user wishes to review the process status values for the computer program;

receive a third input from the user, wherein the third input from the user specifies the date that the user wishes to review the process status values for the computer program;

receive a fourth input from the user; and display a third interactive form on the monitor screen in response to the fourth input from the user, wherein the third interactive form contains the process status values for the computer program for the date selected by the user.

* * * * *